United States Patent
Woodward et al.

(10) Patent No.: US 7,272,302 B2
(45) Date of Patent: Sep. 18, 2007

(54) PSC MOTOR SYSTEM FOR USE IN HVAC APPLICATIONS WITH FIELD ADJUSTMENT AND FAIL-SAFE CAPABILITIES

(75) Inventors: Arthur E Woodward, Manchester, MO (US); Prakash B Shahi, St Louis, MO (US); Ralph D Furmanek, Wildwood, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/266,793

(22) Filed: Oct. 8, 2002

(65) Prior Publication Data

US 2004/0067049 A1 Apr. 8, 2004

(51) Int. Cl.
*H02P 7/06* (2006.01)

(52) U.S. Cl. .................. 388/801; 388/826; 388/843; 318/806; 318/801

(58) Field of Classification Search ........ 388/800–810; 318/563, 432, 434, 433, 798, 801
See application file for complete search history.

(56) References Cited

U.S. PATENT DOCUMENTS

| | | | | |
|---|---|---|---|---|
| 4,415,844 A | * | 11/1983 | Mendenhall et al. | 318/254 |
| 4,549,122 A | * | 10/1985 | Berkopec et al. | 388/806 |
| 5,010,287 A | | 4/1991 | Mukai et al. | 318/801 |
| 5,159,255 A | * | 10/1992 | Weber | 318/775 |
| 5,218,283 A | * | 6/1993 | Wills et al. | 318/748 |
| 5,433,037 A | | 7/1995 | Pazio | 49/139 |
| 5,491,978 A | * | 2/1996 | Young et al. | 62/126 |
| 5,492,273 A | * | 2/1996 | Shah | 236/44 A |
| 5,500,581 A | | 3/1996 | Hatanaka et al. | 318/727 |
| 5,506,486 A | * | 4/1996 | Hayashi et al. | 318/808 |
| 5,656,912 A | | 8/1997 | Yang | 318/808 |
| 5,883,490 A | | 3/1999 | Moreira | 318/807 |

(Continued)

FOREIGN PATENT DOCUMENTS

EP 0495745 7/1992

OTHER PUBLICATIONS

U.S. Appl. No. 10/266,238, filed Oct. 8, 2003, Woodward et al., Pending.

(Continued)

*Primary Examiner*—Lincoln Donovan
*Assistant Examiner*—Renata McCloud
(74) *Attorney, Agent, or Firm*—Locke Liddell & Sapp PLLC

(57) ABSTRACT

A field-adjustable motor control system includes a motor, an inverter coupled to provide energization to the motor, a controller coupled to the inverter, and a field adjustment circuit that provides field adjustment signals to the controller. The controller provides signals to control the output of the inverter in response to received input control signals and field adjustment signals. The input control signals define the controller's operating state that corresponds to a desired system operating state. The field adjustment signals and input control signals define a desired output parameter of the inverter for an operating state. In certain embodiments, fail-safe circuitry is also provided that includes a relay receiving controller signals. The relay's input is coupled to a line power and to the inverter output. The relay's output is coupled to the motor. If the controller fails, the relay couples the line power to the motor.

14 Claims, 18 Drawing Sheets

U.S. PATENT DOCUMENTS

| | | | |
|---|---|---|---|
| 5,903,116 A * | 5/1999 | Geis et al. | 318/140 |
| 6,097,171 A * | 8/2000 | Branecky | 318/808 |
| 6,172,476 B1 | 1/2001 | Tolbert et al. | 318/772 |
| 6,246,207 B1 | 6/2001 | VanSistine et al. | 318/801 |
| 6,346,790 B1 * | 2/2002 | Kemp et al. | 318/813 |
| 6,382,496 B1 | 5/2002 | Harger | 228/44.3 |
| 6,408,130 B1 * | 6/2002 | Elferich | 388/800 |
| 6,472,843 B2 * | 10/2002 | Smith et al. | 318/727 |
| 6,707,270 B2 * | 3/2004 | Chen et al. | 318/798 |

OTHER PUBLICATIONS

U.S. Appl. No. 10/266,451, filed Oct. 8, 2003, Woodward et al., Pending.

Invitation to Pay Additional Fees for PCT/US 03/31569, dated Mar. 19, 2004, 5-pages.

* cited by examiner

PSC MOTOR SYSTEM FOR USE IN HVAC APPLICATIONS WITH FIELD ADJUSTMENT AND FAIL-SAFE CAPABILITIES

BACKGROUND OF THE INVENTION

The present disclosure relates to motor control systems and, more particularly, to permanent split capacitor ("PSC") motor control systems for use in heating, ventilation, and air conditioning ("HVAC") applications.

Conventional HVAC applications often utilize multi-tapped PSC type motors. In general, a multi-tapped PSC motor is a motor that has a multi-tapped main winding where all or part of the main winding is coupled in parallel with an auxiliary starting winding that is coupled in series with a capacitor. Such multi-tapped PSC motors are used in HVAC applications, such as furnace blower and air handler applications, because the multi-tapped winding can produce variable output torque and, therefore, variable output speed for the purpose of delivering different amounts of air flow for different applications. For example, one tap setting may be provided to provide a relatively low amount of air flow to provide for air circulation when there is no heating or cooling activity. Another tap setting could be provided to increase the air flow when cooling is desired. By using multiple taps, various operating states can be established for a tapped PSC motor, such as heating, cooling, and air. In general, each tap point on the multi-tapped PSC motor is coupled to an input line and relays are energized in response to control signals from, for example, a thermostat to provide energization to one of the tap points at any given time.

One characteristic of multi-tapped PSC motors when used with air blowers, such as a squirrel cage blower, is that the Speed vs. Torque curves for such systems are not constant, but have a generally "reverse C shape" wherein the torque will increase with speed up to a maximum point but, thereafter, as the speed increases the torque will begin to decrease. FIG. 1 generally illustrates the Speed vs. Torque characteristics for a conventional multi-tapped PSC motor for low, medium, medium high and high settings with each setting having its own Speed vs. Torque curve. As the figure illustrates, for each Speed vs. Torque curve, as speed increases the output torque will initially increase from a minimum value at or near zero speed to a maximum value and then decrease to near or zero torque at a maximum speed.

In addition to having non-linear Speed vs. Torque characteristics, the operation of conventional multi-tapped PSC motors can be significantly impacted by the static pressure of the environment in which the system is operating. This is reflected by FIGS. 1 and 2, where FIG. 1 was described above, and FIG. 2 illustrates Static Pressure (in inches of water) vs. Air flow (in cubic feet per minute (CFM)) for the various taps of a conventional multi-tapped PSC motor. Lines reflecting average, low and high static pressures are illustrated in FIGS. 1 and 2.

As will be appreciated from FIGS. 1 and 2, for a given tap setting, as the static pressure is increased above the average static pressure value, the speed of the motor will increase. This speed increase will, therefore, result in a decrease in the output torque of the blower and accordingly a decrease in the output airflow from the blower. The reverse may occur if the static pressure drops below the average value. Because of this influence of the static pressure on the output airflow, in most HVAC systems using a multi-tapped PSC motor, the operation of the system will vary (perhaps significantly) from day to day, month to month as the static pressure within which the system operates changes. Such variations provide for unstable and inconsistent operation which is undesirable.

The present disclosure describes several embodiments a motor control system for a PSC motor that are designed to address the described and other limiting characteristics to conventional systems to provide an improved motor control system.

SUMMARY OF THE INVENTION

In accordance with one exemplary embodiment constructed in accordance with certain teachings of the present disclosure, a motor control system is provided that includes a motor, an inverter coupled to provide energization to the motor, a controller coupled to the inverter, the controller providing signals to control the output of the inverter in response to received input control signals to provide a level of output power to the motor, the desired level of output power being determined at least in part by the input control signals.

In accordance with another exemplary embodiment constructed in accordance with certain teachings of the present disclosure, a fail-safe motor control system is provided that includes a motor, an inverter coupled to provide energization to the motor, a controller coupled to the inverter, the controller providing signals to control the output of the inverter in response to received input control signals and in response to field adjustment signals, a relay coupled at its inputs to a source of line power and to the output of the inverter and at its output to the motor, the relay receiving control signals from the controller and being configured such that, in the event of a failure of the controller, the relay will couple the line power to the motor.

In accordance with yet a further exemplary embodiment constructed in accordance with certain teachings of the present disclosure a field-adjustable motor control system is provided comprising a motor; an inverter coupled to provide energization to the motor; a controller coupled to the inverter, the controller providing signals to control the output of the inverter in response to received input control signals and in response to field adjustment signals, wherein the input control signals can define a first and a second operating state of the controller, each of the first and second operating states corresponding to a desired operating state of the system; a first field adjustment circuit for providing a first field adjustment signal to the controller, the first field adjustment signal, in combination with the input control signals, defining a desired output parameter of the inverter for the first operating state; and a relay coupled at its inputs to a source of line power and to the output of the inverter and at its output to the motor, the relay receiving control signals from the controller and being configured such that, in the event of a failure of the controller, the relay will couple the line power to the motor.

Other aspects of the present disclosure will be apparent from a review of the disclosure, the figures and the claims.

BRIEF DESCRIPTION OF THE DRAWINGS

The description is presented with reference to the accompanying drawings in which.

DESCRIPTION OF EMBODIMENTS

Figure 3A:
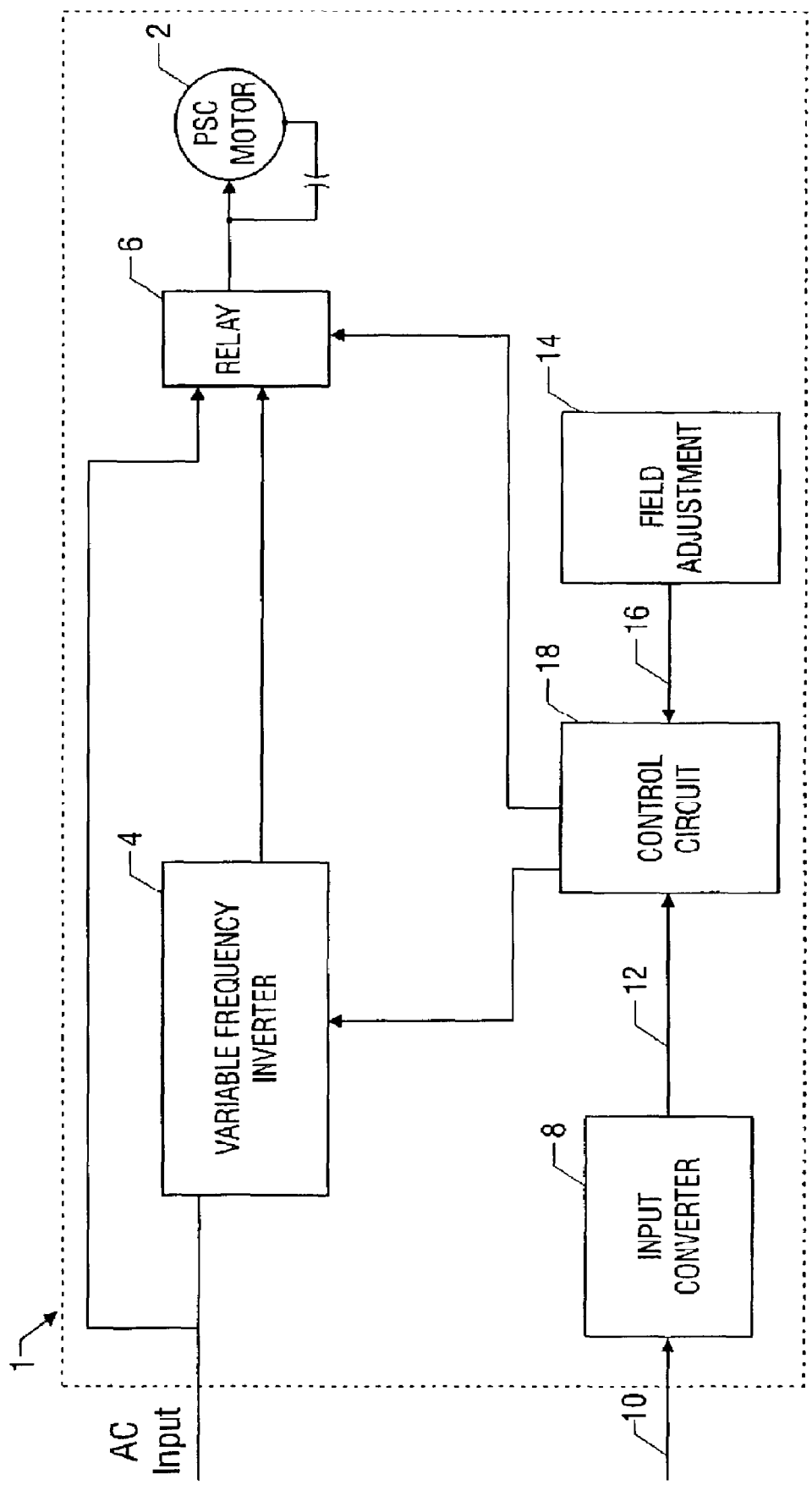
FIGS. 3A and 3B generally illustrate an exemplary permanent split capacitor ("PSC") induction motor control system constructed in accordance with certain teachings of this disclosure for use, for example, as a blower drive for an HVAC application FIG. 4 generally illustrates an exemplary non-tapped (single speed) PSC motor including a main winding that is coupled in parallel with a series connection of an auxiliary winding and a capacitor for use in the exemplary system of FIGS. 3A and 3B.
Figure 3B:
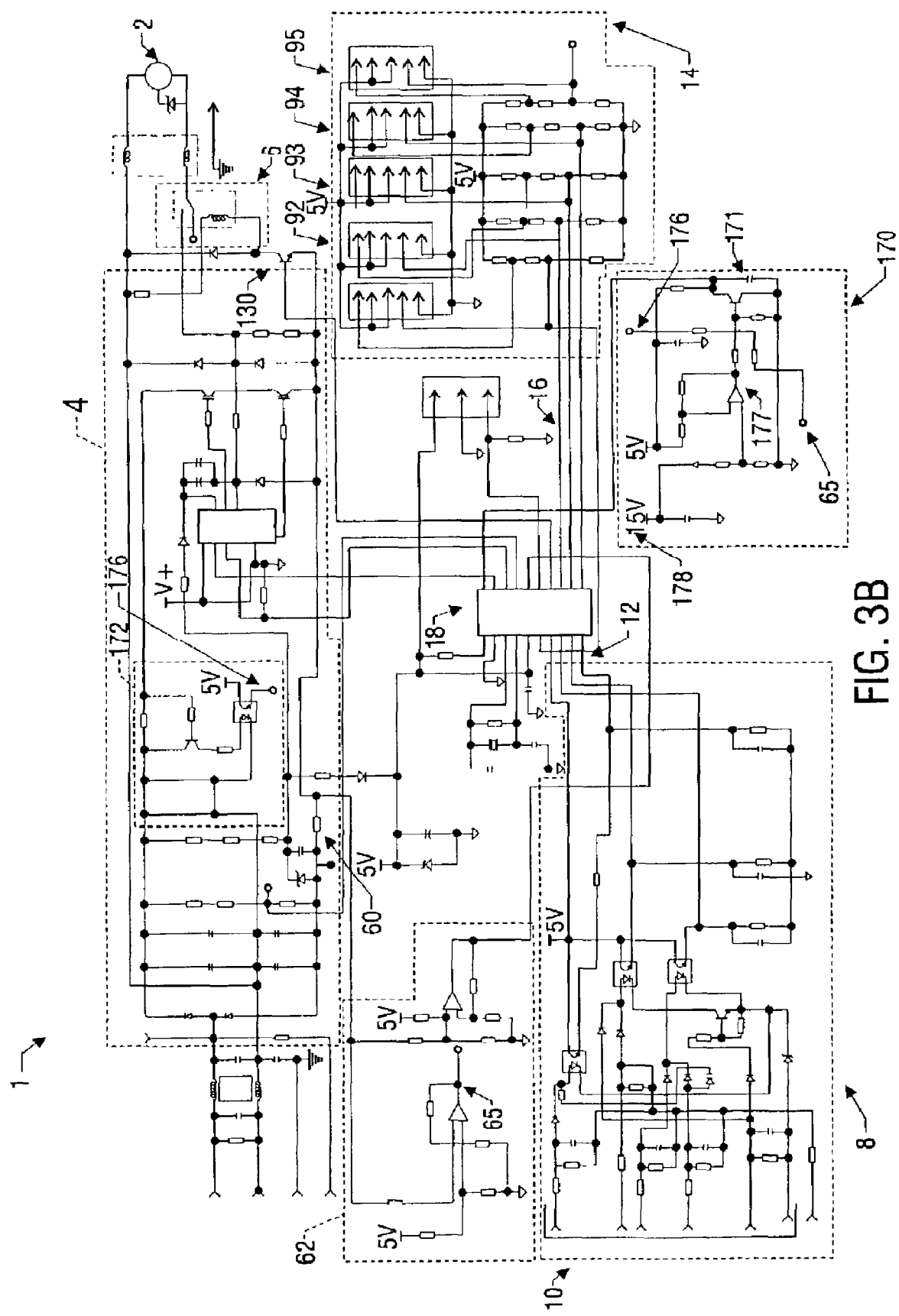

Turning to the drawings and in particular to FIGS. 3A and 3B, a permanent split capacitor ("PSC") induction motor control system 1 for use, for example, as a blower drive for an HVAC application is illustrated.

The illustrated PSC inverter system 1 comprises six primary components and/or component systems: (i) a permanent split capacitor motor 2; (ii) a variable frequency inverter 4 coupled to provide output power to the motor 2; (iii) a switching relay 6, configured to couple the input of the PSC motor 2 to either the output of the variable frequency inverter 4 or line power; (iv) an input converter 8 that receives input signals 10 in one form from, for example, a furnace board or a thermostat and converts the same to logic level control signals 12; (v) a field adjustment system 14 that can be set in the field to provide variable field adjustment signals 16 to adjust the effect of the control signals 12 on the operation of the motor control system; and (vi) a control circuit 18 that receives control signals 12 and field adjustment signals 16 and controls the variable frequency inverter 4 and the switching relay 6 to drive the motor 2 in a desired manner. The components of the system are illustrated in a block form in FIG. 3A and in more detail in FIG. 3B.

In general, AC line power is provided as an input to the variable frequency inverter 4. The variable frequency inverter 4 converts the AC line power to a DC bus voltage and then converts the DC bus voltage to a single-phase synthesized sinusoidal waveform of variable voltage and frequency for application to the motor. AC line power is also provided to a first input contact point for the relay 6 which, in the illustrated embodiment of FIGS. 3A and 3B, is a single pole, double throw relay. The output from the variable frequency inverter 4 is provided to a second input for the relay 6. The output of the relay 6 is coupled to one input terminal of the PSC motor 2. In the example above, the other input to the PSC motor 2 is coupled to one of the ac input lines.

In operation, the controller 18 controls the relay 6 to couple the input of the PSC motor 2 to either the output of inverter 4 or to the line power. In general, the controller 18 determines the operating state of the system in response to the control signals 12 and the field adjustment signals 16. Depending on the operating state defined by the control signals provided to the controller 18, the controller will either: (a) generate signals to switch the relay 6 to couple the motor 2 to AC line power, thus operating the motor 2 at a substantially fixed speed corresponding to the line frequency; or (b) generate signals to switch the relay 6 to couple the motor 2 to the output of the inverter 4 and also generate control signals to control the inverter 4 to provide a single phase output voltage having appropriate voltage and frequency characteristics to drive the PSC motor 2 in a desired manner.

In many applications of the illustrated system the inverter 4 will be driving the motor 2 when the HVAC system is performing active heating and/or cooling operations. In such applications, the controller 18 may be configured to operate in multiple operating states for each operation state. For example, the controller 18 may be configured to provide differing output currents at different settings or differing output frequencies or to control the power output of the blower to provide different CFM outputs. These precise configuration and settings for the controller 18 may be software and/or field programmable. As a result, the installer of a product containing the illustrated PSC Inverter System may adjust the operation of the system depending on the comfort level of the consumer.

Controller 18 may be a microprocessor-based, software driven controller that receives input commands and generates switching signals for the relay 6 and the inverter 4 to control the motor 2 in an optimized manner. In general, the controller 18 controls the relay 6 based on the desired output frequency of the inverter. At desired output frequencies around line frequency, the controller will typically switch the relay 6 to couple the PSC motor 2 to the line. The precise speed threshold level at which such a switching of the relay 6 occurs may vary. This variation may depend on the specific mode in which the controller is operating or whether the motor is going from a higher speed to a lower speed or vice versa.

At desired output frequencies below the threshold level, the controller 18 will switch the relay 6 to couple the PSC motor 2 to the output of the inverter 4. The controller will also generate signals to control the switching of the power switches in the inverter 4 to provide an output having the desired voltage and frequency to achieve the desired output speed. Again, the threshold level where the controller switches to the inverter 4 output can be fixed or can vary with the operating mode of the controller or other conditions.

In one embodiment, the controller 18 will switch the relay 6 to drive the motor 2 from the inverter 4 when the frequency of the voltage to be applied to the motor 2 is below some fixed percentage of the line frequency (e.g. 80%, 90% 95% or some other percentage). In that embodiment, the controller 18 will switch the relay 6 to provide line voltage when the frequency of the voltage to be applied to the motor is over the fixed percentage. Still further embodiments are envisioned where the frequency selected for a line to inverter transition is different from the frequency required for an inverter to line transition.

Further, details and alternate constructions of the various components of the system of FIGS. 3A and 3B are provided below.

In the example of FIGS. 3A and 3B, the PSC motor 2 is a single phase PSC motor of a size that is commonly found in circulation blowers for HVAC applications (e.g., an approximately ⅓ hp to 1 hp). The PSC motor 2 may be a conventional multi-tapped PSC motor or may be a specially constructed, non-tapped PSC motor having only two motor input leads. Generally, a run capacitor as used on conventional PSC motors should be used since the embodiments described herein utilize signal phase power to drive the motor. If a multi-tap PSC motor is used, only the highest speed tap should typically be used in connection with the illustrated system.

Figure 1:
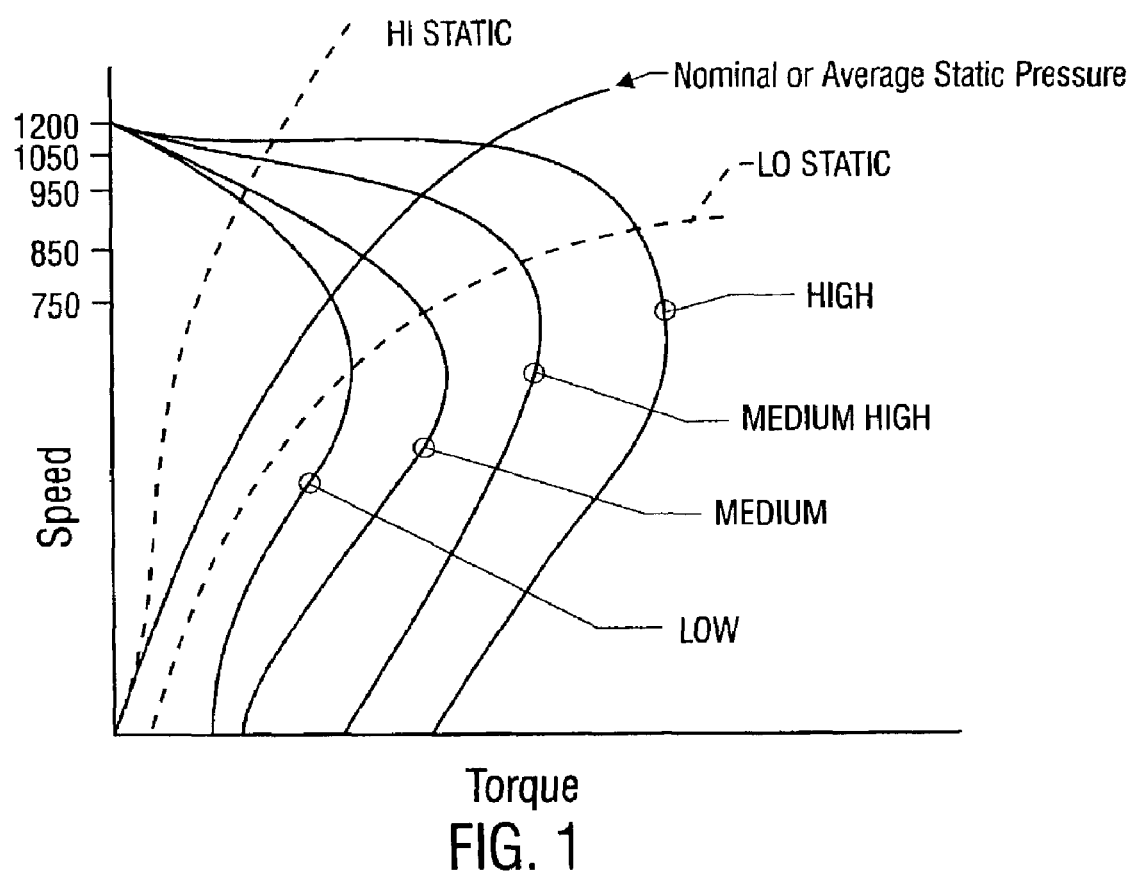
FIG. 1 generally illustrates the Speed vs. Torque characteristics for a conventional multi-tapped PSC motor for low, medium, medium high and high settings with each setting having its own Speed vs. Torque curve.
Figure 4:
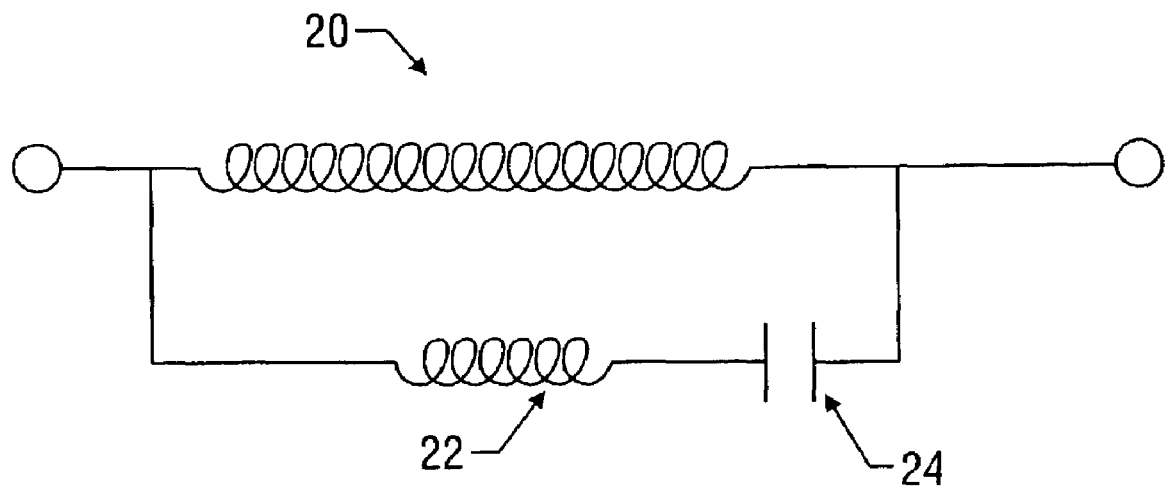
Figure 2:
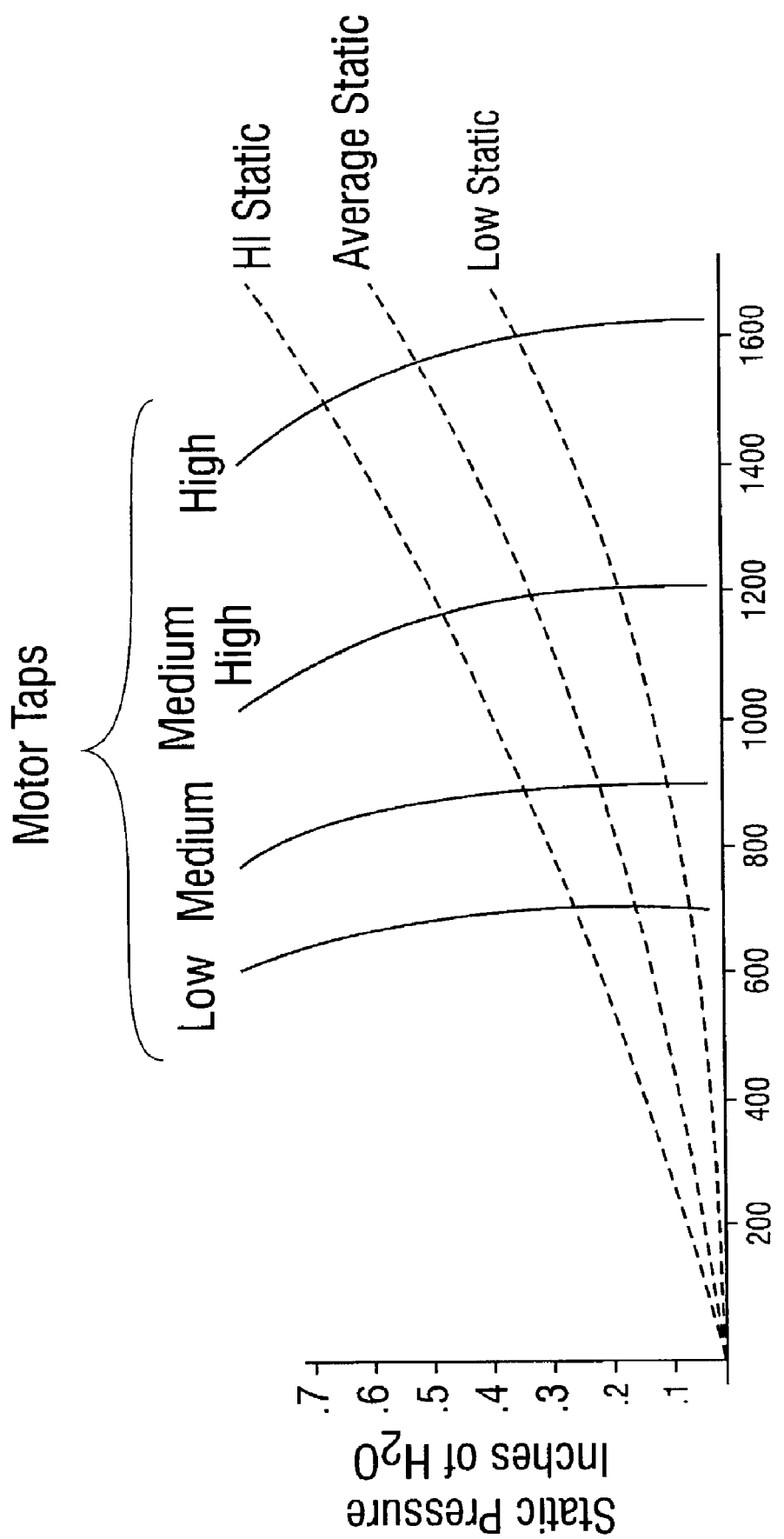
FIG. 2 illustrates Static Pressure (in inches of water) vs. Air flow (in cubic feet per minute (CFM)) for the various taps of a conventional multi-tapped PSC motor as illustrated in FIG. 1.

In a preferred embodiment, a non-tapped (single speed) PSC motor 2 is provided that includes a main winding that is coupled in parallel with a series connection of an auxiliary winding and a capacitor. A schematic representation of such a motor is illustrated in FIG. 4 where a main winding 20 is coupled in parallel with a series connection of a auxiliary winding 22 and a capacitor 24.

To control the amount of noise and/or vibration produced by operation of the motor 2, it may be desirable to select the winding pattern for the windings 20 and 22 to produce the lowest average noise over the range of expected operating frequencies. Alternately, in embodiments where it is anticipated that the motor 2 will be operating predominantly in response to an excitation signal of a given frequency (e.g., a frequency corresponding to an operating state of the system where the blower is in a FAN or CIRCULATION mode), it may be desirable to wind the motor so that the noise/vibration produced at the anticipated predominate operating frequency is minimized. Additionally, in a motor specifically constructed for use with the motor control system described herein, the amount of copper in the main winding can be increased to increase the overall efficiency of the system.

While the exemplary system of FIGS. 3A-3B may be used with PSC motors across a large range of horsepower ratings, it is anticipated that the described systems will be used with PSC motors having ratings of between ⅕ to 1 Hp.

As illustrated in FIGS. 3A-3B, the motor control system 1 receives input command signals 10 that determine the operating state of the system 1. In the illustrated embodiment, the operating state of the system 1 is determined based on three logic level control signals 12 that are developed and provided by an input converter circuit 8 based on up to five relatively high voltage level signals 10. The relatively high voltage signals 10 may be provided by, for example, a conventional thermostat or an ignition control board in a furnace that was designed to control a PSC motor having a multi-tapped winding. The use of the input converter circuit 8 allows for the motor control system 1 to be used in retrofit applications where the control system 1 will replace a conventional system that operates in response to signals from a conventional thermostat or from control signals provided by an ignition control board in a furnace.

Certain existing HVAC systems operate in response to voltage signals provided by a conventional, e.g., wall-mounted, thermostat. In general, such conventional thermostats provide output control signals at a level of approximately 24 Volts AC. Although the precise nature of the signals provided by such conventional thermostats will vary from thermostat to thermostat, there is typically an output signal "FAN," that is energized with 24VAC when the fan is to operate in a circulate mode; a "HEAT" output that is energized with 24VAC when the thermostat is indicating that the system is to operate in a heating mode; a "COOL" signal that is energized with 24VAC when the thermostat is indicating that the system needs to operate in a cooling mode. Certain types of thermostats also have a HIGH HEAT and a HIGH COOL signals. The precise manner in which the 24VAC signals described above are provided by a thermostat will vary from thermostat to thermostat. For some thermostats, only one of the output signals (e.g., HEAT) will be active high at any given time. For other thermostats, multiple signals may be simultaneously active high (e.g., FAN and HEAT). As described below, the construction of the input interface circuit is such that the system can properly function with a wide variety of thermostats and thermostat signals.

In most furnaces a furnace control board or an ignition control board uses these 24VAC signals to control various relays located on the ignition board. These relays are typically switched to provide 115VAC output power that is applied directly to one tap of a multi-tap motor. In such systems, only a single output is typically active in a given operating mode, as that will be the output used to power the motor coupled to the HVAC blower at the desired speed. Such ignition control board systems typically are capable of providing from three to five different outputs, with the outputs generally corresponding to FAN (Circulate); HEAT; HIGH HEAT; COOL and HIGH COOL. As described below, the input interface 8 is constructed to be able to properly process such 115VAC signal outputs as input commands. The input interface 8 can also properly interpret the 24VAC input signals with some component value changes that will be apparent to those of ordinary skill having the benefit of this disclosure.

Figure 5:
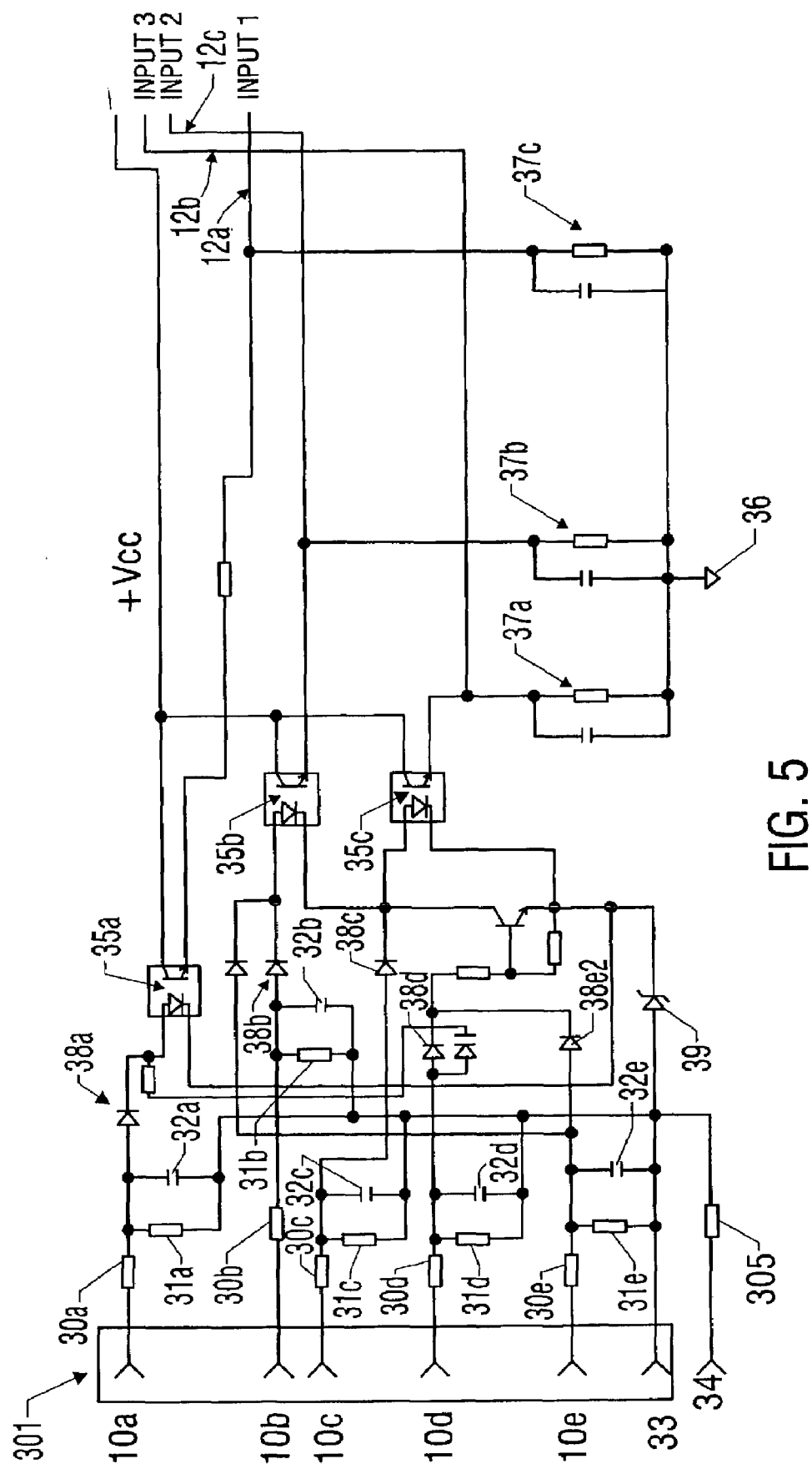
FIG. 5 generally illustrates an exemplary embodiment of the input conversion circuitry 8 of FIGS. 3A and 3B for converting relatively high voltage level signals 10 (e.g., 24V or 115V signals) in one format into logic level signals (e.g., 5V signals) of another format for use in determining the operating state of the control system.

FIG. 5 generally illustrates an exemplary embodiment of the input conversion circuitry 8 for converting relatively high voltage level signals 10 (e.g., 24V or 115V signals) in one format into logic level signals (e.g., 5V signals) of another format for use in determining the operating state of the control system 1.

Referring to FIG. 5, the input conversion circuitry 8 includes an interface board which directly receives the signals 10A-10E from either a thermostat (24V) or a furnace ignition control board (15 VAC). Each signal 10A-10E is then applied to processing circuitry that includes: (1) a return path for allowing for some of the current flowing from the ignition control board to flow through the processing circuit and back to the source of the signal; and (2) a active path that, depending on the state of the input signals 10, will pass through one or more optocouplers to set the states of the three logic level output signals 12. The optocouplers are configured to provide outputs signals at logic levels suitable for processing by the digital controller 18.

Each of the return paths for each of the five high voltage level signals 10A-10E includes an initial input resistor (30*a* for signals 10A, 30*b* for signals 10B, etc.), coupled in series with a parallel connection of a resistor 31*a*-31*e* and capacitor 32*a*-32*e* coupled to a common return path. In the illustrate embodiment of FIG. 5, two common return paths are provided such that the same circuit 8 can handle input signals at 24V or 115VAC levels. A first return 33 is provided for handling 24V control signals. A second return 34 is provided that includes a drop-down resistor 35 that may be used when an ignition control provides very high output voltage signals at, for example, a 115VAC level.

In addition to being provided to the first return path described above, the signal from the ignition control board is applied to a secondary processing circuitry that combines and converts the signal to three digital logic level signals. The secondary processing is slightly different for each signal from the ignition control board and combines the five high-level voltage signals 10A-10E to produce three logic level control signals 12A-12C.

It should be understood that the precise nature of the secondary processing circuitry may vary depending on the precise form that the input signals 10 from the thermostat or ignition control board take. In general, because the input conversion circuitry 8 provides three logic level output signals 12A-12C, there are eight possible operating states of the system. In the exemplary embodiment described herein, however, only five of these states are utilized with the five utilized states corresponding to: HI COOL, LOW COOL, HIGH HEAT, LOW HEAT OR FAN/RECIRCULATION. In general, the nature of the secondary processing circuitry is such that the input signals 10 produce the combination of the logic level signals 12 that corresponds to the operating mode commanded by the thermostat or furnace board. For example, if the combination of logic level signals 111 corresponds to FAN/RECIRCULATION the second circuitry should be configured such that the receipt of the 24V or 115VAC signal(s) corresponding to the circulate mode would produce the desired logic level output signal 111.

In the exemplary embodiment of FIG. 5, the three logic level signals 12A-12C are provided, respectively, as outputs from three optocouplers 35A-35C. The optocouplers 35A-35C provide a mechanism for converting the high-level voltage signals to logic level signals and for isolating the high voltage side of the input conversion circuit 8 from the logic level side of the circuit, thus providing some degree of intrinsic safety.

Each of the optocouplers 35A-35C has, on the input side, two input terminals and, on the output side, two output terminals. In FIG. 5, the upper output terminals of the optocouplers 35A-35C are tied to the logic supply voltage Vcc. The lower output terminals of the optocouplers 35A-35C provide the logic level signals 12A-12C. Such lower output terminals are all coupled to a common ground point 36 through parallel connections 37A-37C of a resistor and a capacitor. These resistor-capacitor networks thus normally provide logic low levels on the signals 12A-12C when the optocouplers are off. However, when one of the optocouplers 35A-35C is turned on, it will pull its associated output signal to the high logic state.

The value of the logic level output signals from the optocouplers 35A-35C will be determined by the value of the input signals 10A-10E. In the exemplary embodiment of FIG. 3, the logic level signal 12A will be determined by the input to the upper input terminal of optocoupler 35A which corresponds directly to the input signal 10A. Thus, whenever the level of the 10A signals is at a high level, current will flow from input 10A, through a diode 38A, through optocoupler 35A and through zener diode 39 to one of the two return paths (33 or 34). The zener diode 39 should be selected to control the voltage threshold for the 24VAC inputs and the resistor 305 should be selected to control the amount of current flowing through the optocoupler with 115VAC inputs to ensure that the optocoupler 35A is not damaged or overloaded. The current signal flowing through the input terminals of the optocoupler 35A will be controlled by the precise nature of the secondary circuitry and, as described above, should properly map the input signals 10A-10E to the appropriate logic level signals 12A-12C.

While the above discussion focuses on the impact of signal 10A on output 12A, the impact of the other input signals 10A-10E on the logic level output signals 12A-12C would be apparent to one of ordinary skill in the art having the benefit of this disclosure.

Thus, in the manner described above, the input conversion circuit 8 can convert five conventional high level voltage signals from the ignition control board are converted into three logic level digital signals for application to the microprocessor-based controller 18.

As described above, the microprocessor-based controller 18 receives the logic control signals 12A-12C and in response to these signals—and other signals as described below—controls the switching of the inverter to operate the PSC motor 2 in one of several possible operating modes.

Referring to FIGS. 3A and 3B, the microprocessor-based controller 18 may be any suitable controller such as, for example, the MCU MC68HC908JK3 available from Motorola. The controller should include an interface for receiving the logic level control signals 12A-12C as well as the field adjustment signals 16, to be discussed in more detail below.

In general, the logic level signals 12A-12C determine the operating state of the microcontroller 18. As described above, the logic level signals that define the operating state may come from the input conversion circuit 8 or directly from a thermostat designed to provide such logic level outputs. Such a thermostat may use, for example, serial communication through the optocouplers for isolation or an RF communications link.

In addition to being able to provide control capability to multiple operating states, the controller 18 of the present disclosure may be programmed to operate in one or more operating modes. For example, the controller may be configured to operate in a CURRENT CONTROL MODE, where each operating state in such mode corresponds to a desired motor current. Alternately, the controller may be configured to operate in a FREQUENCY CONTROL MODE, where each operating state in such mode defines a desired output voltage frequency. Still further, the controller 18 may be configured to operate in a SPEED CONTROL MODE where the output speed of the motor is controlled or a POWER CONTROL MODE where the power output of the inverter coupled to the PSC motor is controlled. Still further embodiments are envisioned where, depending on the types of inputs received by the controller 18, the controller may be configured to switch among any of the described—or other possible—operating modes.

The operating of the controller 18 in the CURRENT CONTROL MODE will be initially discussed.

In the CURRENT CONTROL MODE, each of the eight possible operating states (as defined by the logic level inputs 12A-12C) will correspond to a desired current level in the PSC motor 2. In this mode, a current feedback signal will be provided to the controller 18 to provide an indication to the controller of the magnitude of the current in the motor winding. The current feedback signal may be obtained from a current sensor coupled to the windings of the PSC motor 2 or derived from a current sensor or sensor positioned within one or both legs of the inverter 4.

In one exemplary embodiment, the current feedback signal provided to the controller 18 is taken from a current sensor in the lower leg of the DC bus in the inverter 4. This embodiment is illustrated generally in FIG. 3B and FIG. 6.

Referring to FIG. 3B, it may be noted that there exists a shunt resistor 60 that is positioned in the lower leg of the DC bus. A voltage reading from this shunt resistor is provided as an input to a lower leg current monitoring circuit, that is illustrated in more detail in FIG. 6. Because the voltage across the shunt resistor 60 will vary with changes in the current flowing in the lower leg of the inverter and because the current flowing in the lower leg of the inverter will correspond to the current in the PSC motor 2, the voltage from the shunt resistor 60 provides an indication of the current in the PSC motor 2.

Figure 6:
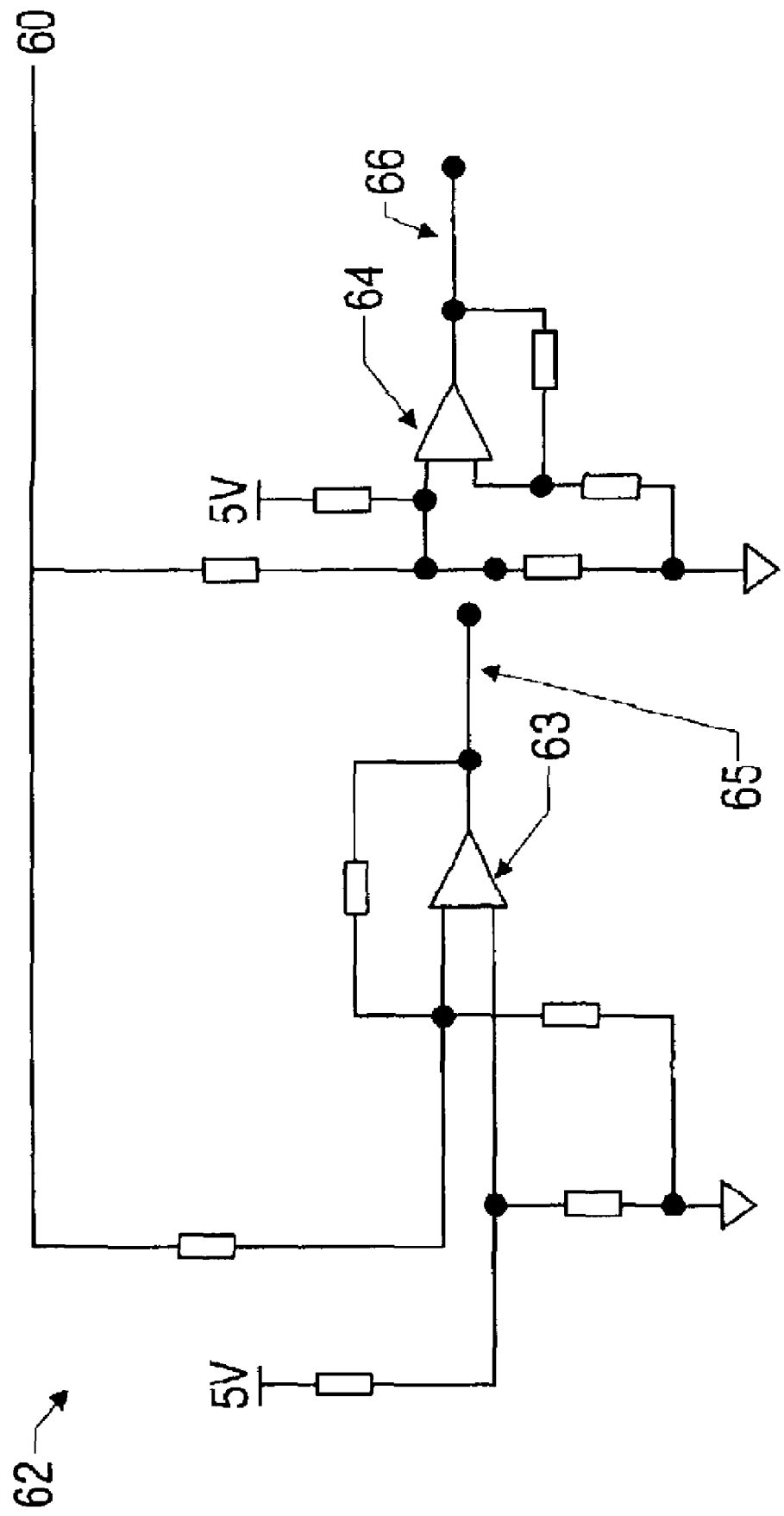
FIG. 6 generally illustrates an exemplary lower leg current monitoring circuit for monitoring the current in the lower leg of the inverter 4 of FIGS. 3A and 3B.

Referring to FIG. 6, the voltage from the shunt resistor 60 is provided as an input to two differential amplifiers 63 and 64. Differential amplifier 63 is configured as a comparator and it compares the detected voltage value to a reference value and generates a lower current trip signal on line 65 in the event that the voltage value exceeds a predetermined value. As described in more detail below, the lower current trip signal may result in a resetting of the controller 18.

As reflected in FIG. 6, the voltage from the shunt resistor 60 is also applied as an input to differential amplifier 64. Differential amplifier 64 is configured to perform some filtering and voltage level adjustment of the signal from the shunt resistor to product an output voltage signal on line 66 that varies with, and corresponds to, the voltage from the shunt resistor 60 and, therefore, that varies with and corresponds to the current flowing in the PSC motor 2. Differential amplifier 64 should be configured to produce an output voltage that varies in response to the input voltage but where the maximum expected output voltage on line 66 will be less than the maximum input voltage of the A to D converter and the logic supply voltage supplied to the controller 18.

While FIGS. 3B and 6 illustrate the use of a shunt resistor to generate a signal representative of the PSC motor current, other forms of current detection may be used.

In the current control mode, the microcontroller 18 will compare the value of the current feedback signal with the desired current level for the selected operating state. If the comparison indicates that the motor current is less than the desired setpoint current, then the controller 18 will increase the output voltage and frequency applied to the windings of motor 2 so as to tend to increase the current in the motor 2 by increasing the speed of the blower motor. If the comparison indicates that the motor current is above the desired setpoint current, then the controller will decrease the voltage and frequency of the output voltage to tend to cause the current in the motor to decrease by reducing the speed of the blower motor. This comparison and adjustment of the output voltage and frequency will regularly occur in an effort to maintain the current in the motor at the desired setpoint level. The comparison and adjustment may be done in software, hardware or firmware and the implementation of such functionality will be within the level of one of ordinary skill in the art having the benefit of this disclosure.

In one embodiment, the relationship between the output voltage and the output frequency will vary depending on the specific operating state of the system. In this embodiment, each operating state—in addition to defining a particular desired current setpoint—will also define a desired volts/hertz curve such that the relationship between the output voltage and the current may vary from operating state to operating state. In such an embodiment, the volts/hertz curve may take any appropriate form. In one desired embodiment, linear volts/hertz curves are used.

Figure 7A:
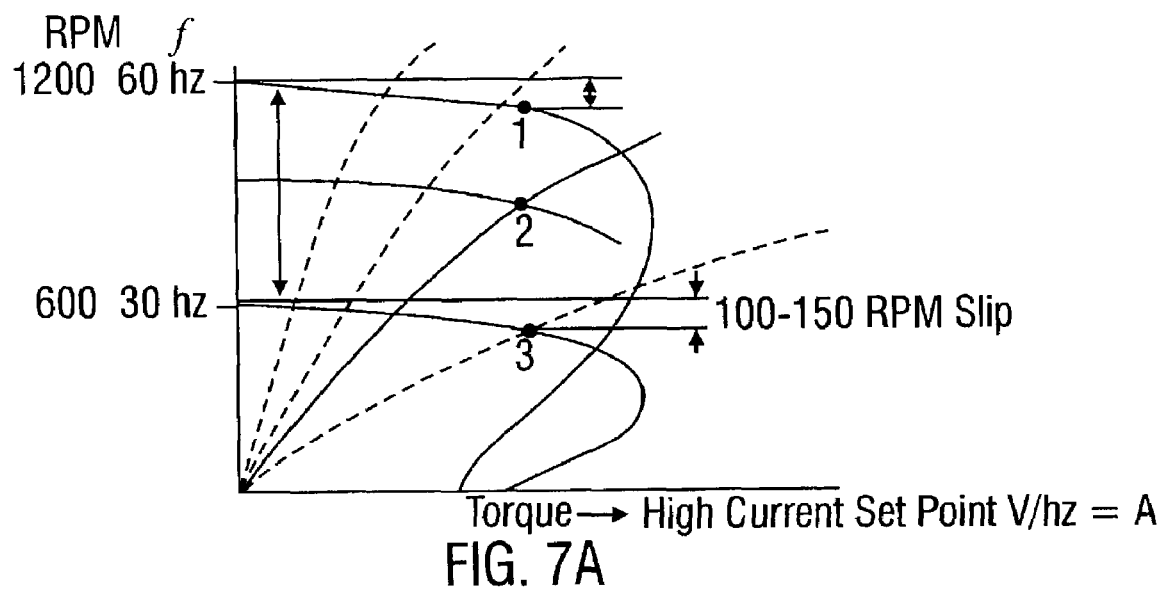
"FIG. 7A illustrates a representative frequency (y-axis) versus torque (x-axis) curve for an exemplary control system of FIGS. 3A and 3B, wherein operating state A is the high current setpoint.
Figure 7B:
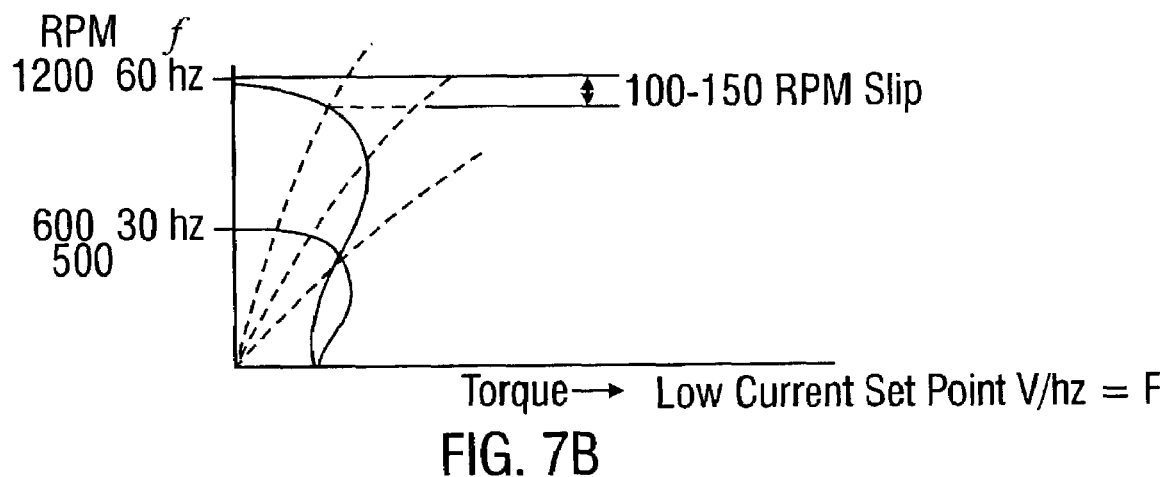
FIG. 7B illustrates a representative frequency (y-axis) versus torque (x-axis) curve for an exemplary control system of FIGS. 3A and 3B, wherein operating state F is the low current setpoint.
Figure 7C:
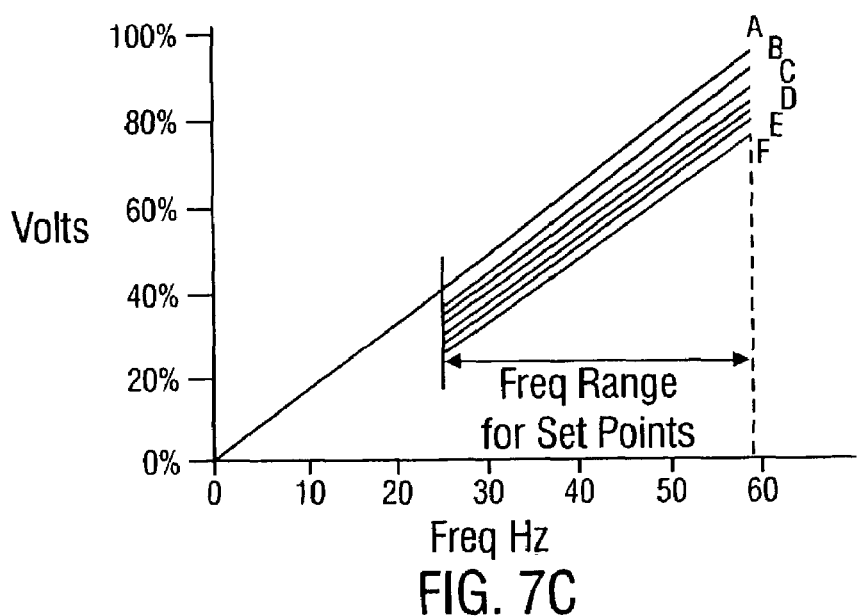
FIG. 7C illustrates a representative volts (y-axis) versus frequency (x-axis) for six exemplary operating states (A, B, C, D, E and F) of the exemplary controls systems of FIGS. 3A and 3B.

FIGS. 7A, 7B and 7C generally illustrates representative volts/hertz curves for six exemplary operating states A, B, C, D, E and F of exemplary control systems of the present disclosure. Note that the desired current setpoints for such operating states are not reflected in FIGS. 7A-7C.

Referring to FIG. 7, it may be noted that each of the volts/hertz curves is linear in that the rate of change of the output frequency is constant when compared to the rate of change of the output voltage. In the illustrated example, each volts/hertz curve also has a minimum output frequency and a maximum output frequency. In one embodiment, the minimum output frequency during normal operation of the control system is 26 Hz and the maximum output frequency is 57 Hz (corresponding to a speed range for the PSC motor 2 of 500-1100 RPMs). Alternate embodiments are envisioned wherein different ranges of output frequency are possible, including embodiments wherein the maximum output frequency during normal operation is 60 Hz (the typical line frequency) or even higher. In such embodiments when the desired output frequency is at or near 60 Hz, the controller 18 may be programmed to generate a control signal to switch a relay to cause the motor to operate off line power.

In addition to having minimum and maximum operating frequencies, the voltz/hertz curves of FIG. 7 also define minimum and maximum voltage values. Notable, while the minimum and maximum frequency values are shared by the curves for the different operating states, the minimum and maximum voltage levels may be different. In the example of FIG. 7 each operating state defines a different minimum voltage value and different maximum voltage value.

The precise nature of the volts/hertz curves for the various operating states should be set to maximize a desired operating characteristic of the system such as, for example, efficiency, noise, vibration, etc. In the embodiment illustrated in FIG. 7, the volts/hertz curves were selected to provide for maximum operating efficiency.

This use of differing volts/hertz curves for each operating state in the CURRENT CONTROL mode produces PSC motor tap-like performance, in that, the energization characteristics of the motor at the different operating states causes the motor to operate differently.

Unlike a tapped PSC motor, however, the use of the CURRENT CONTROL mode as described herein allows for operational advantages that are not obtainable with a conventional PSC motor and control system. For example, if the volts/hertz curves are selected to control the slip of the motor, the present system can provide for highly efficient operation, even at low operating speeds, provided that the volts/hertz curves are selected to maintain a slip within, for example, the range of 100-200 RPM for all of the operating states and for all static pressures. Alternate embodiments are envisioned where the slip is even less. Typically the slip will be at least 50 to 75 RPM for a conventional six pole PSC motor. Additionally, because the operating characteristics of the PSC motor 2 are adjusted depending on the operating state of the system and because it is the current in the motor 2 that is being controlled, excess airflow at high speeds and low static pressures can be eliminated.

Figure 8:
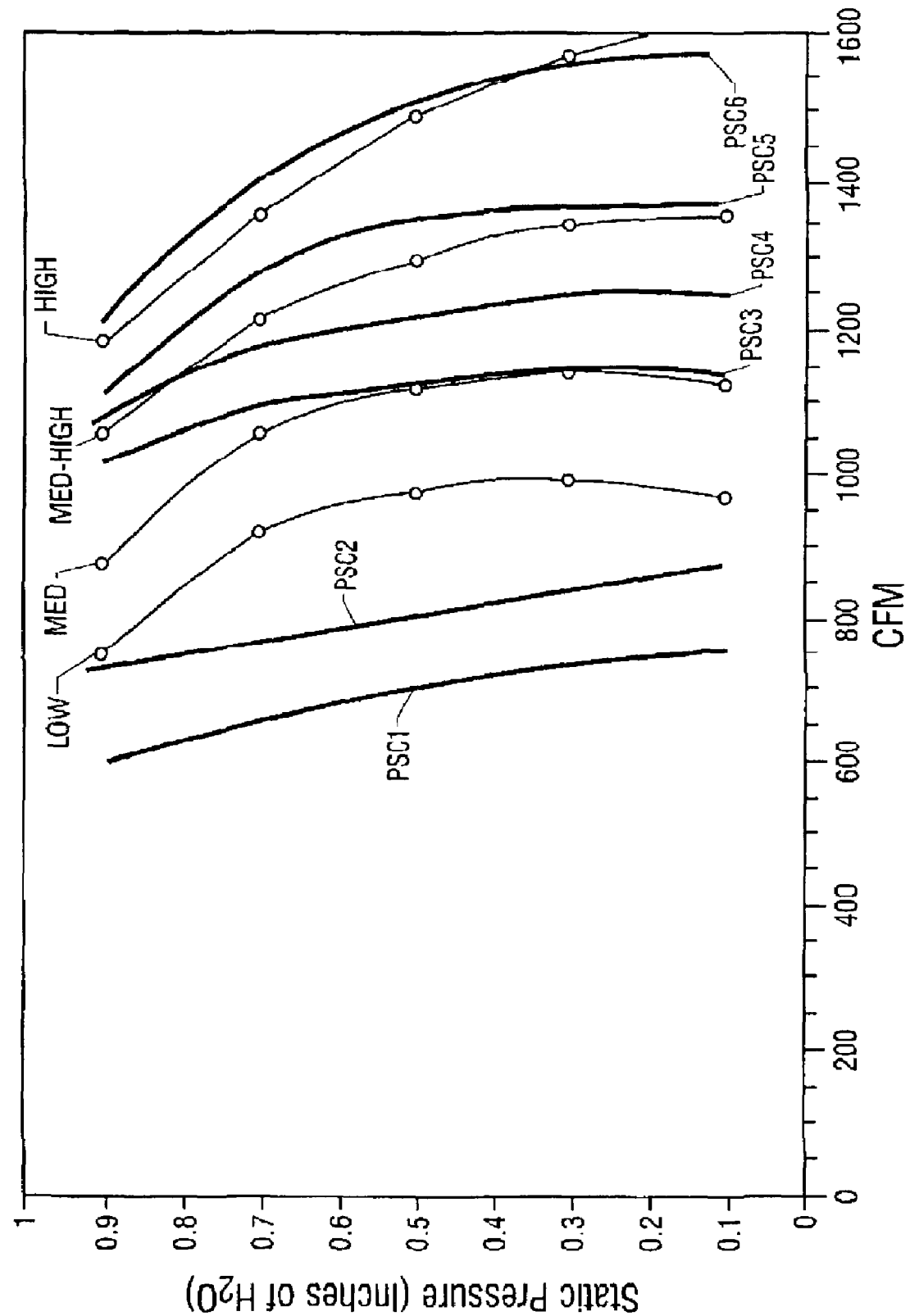
FIG. 8 generally compares exemplary CFM/Static Pressure curves for one exemplary embodiment of the system of FIGS. 3A and 3B operating in the CURRENT CONTROL MODE with exemplary curves for a conventional multi-tapped PSC motor.

FIG. 8 provides a general comparison of the performance of the current system operating in the current control mode with the performance of a conventional, multi-tapped PSC motor. Specifically, FIG. 8 illustrates CFM/Static Pressure curves for a system as described herein operating in the CURRENT MODE and a conventional multi-tapped PSC motor. The CFM/Static Pressure curves for the system of the present invention are illustrated in bold for six different operating states and CFM/Static Pressure curves for the conventional PSC motor are illustrated in the light lines for four different taps. As the figure illustrates, for all of the illustrated operating states or tap settings: (1) the curves associated with the system described herein are straighter (meaning that the CFM output of the system is more constant); and (2) the system described herein allows for airflows at a lower CFM level than is available with the tapped PSC system. Moreover, although not reflected directly in FIG. 8, the system described herein uses less energy for the same airflow for all operating states/taps except for the highest speed tap.

In addition to being capable of operating in CURRENT CONTROL mode, the controller 18 of the present disclosure can operate in a FREQUENCY CONTROL mode. In the FREQUENCY CONTROL mode, each operating state (as defined by the input signals 12A-12C) defines a desired output voltage operating frequency. Each output operating frequency will also correspond to a desired output voltage, with the voltage varying linearly with changes in the desired output frequency. Thus, in this FREQUENCY CONTROL mode, the input signals 12A-12C will define a desired operating frequency which will have a corresponding desired output voltage. The controller will then drive the inverter to provide the desired output frequency and voltage and the motor current will not be directly controlled.

In the FREQUENCY CONTROL mode, the frequency output for the inverter will correspond roughly to the rotational speed of the motor and, thus, roughly to the blower output. In one embodiment, the controller 18 may be configured to drive the inverter to produce one of eight possible output frequencies. For example, the controller may be configured to provide output operating frequencies of 60 Hz, 55 Hz, 50 Hz, 45 Hz, 40 Hz, 35 Hz, 30 Hz and 25 Hz with the higher frequency output corresponding to higher blower speeds and generally higher CFM outputs and the lower frequency outputs corresponding to generally lower speeds and lower CFM outputs.

One potential issue with operating the system in the FREQUENCY CONTROL mode is that the output parameter of most consequence to the user of the HVAC system in which the motor system is used is not inverter output frequency but rather the CFM moved by the blower. In general—at a given static pressure—the CFM moved by the blower will correspond to the rotational speed of the blower motor, which will correspond to the frequency of the inverter output voltage. However, for a given output frequency, the actual CFM moved by the motor will vary significantly depending on the static pressure against which the blower is working. Thus, in the FREQUENCY CONTROL mode, the CFM produced from a HIGH HEAT setting will vary depending on the static pressure of the system which can be affected by, for example, the ambient atmospheric pressure, the number of doors in a house that are opened or closed, the position of the return ducts, etc. As such, controlling the inverter to produce a set frequency does not necessarily result in good CFM control.

To overcome some of the limitations of the FREQUENCY CONTROL mode, a POWER CONTROL mode may be provided in which each operating state corresponds to a desired POWER OUTPUT of the inverter. Because the actual work done by the blower will generally correspond to the CFM moved by the blower—regardless of the static pressure—this form of control may more accurately control the CFM and provide enhanced control of the system. Accordingly, under this control scheme, while the output voltage magnitude and frequency of the inverter may vary for a given operating mode (e.g., HIGH HEAT), the actual CFM for the mode will be relatively constant irrespective of changes in the static pressure.

The work output of the motor can be accomplished by sensing the voltage applied to the motor and the current drawn by the motor, which will indicate the power applied to the motor. Once the power actually being drawn by the motor is detected, the inverter can be controlled to adjust the voltage and/or frequency output of the inverter until the desired power is being drawn by the motor, and therefore, the desired amount of work and CFM circulation is being done by the motor. Under such a control scheme, the setpoints for the various operating modes would correspond to desired workloads (or even desired CFM outputs).

The various operating modes described above may be implemented through software, hardware and/or firmware within the controller 18 or an external memory may be provided to determine the functionality of the controller 18 and, therefore, the functionality of the system. In one exemplary embodiment, the software that determines the functionality of the controller 18 and, thus, the system, is stored in flash memory located within the controller 18. In such an embodiment, a data exchange port may be provided to allow for updating and modification of the software within the controller 18 and for changing the operating mode of the controller. In some embodiments, the data exchange port may also be used for monitoring the operation of the controller 18 and receiving diagnostic data about the over system.

As described above, the field adjustment circuit 14 allows for field adjustment of the setpoints that correspond to the operating states defined by the control signals 12A-12C. In general, for each possible operating state, some form of circuitry may be provided in the field adjustment circuit 14 to allow for modification or adjustment of the set point corresponding to that operating state. Thus, if the controller 18 is operating in the CURRENT CONTROL MODE and the input signals can define five valid operating states, with each operating state corresponding to a specific current setpoint, the field adjustment circuit may allow for modification of the current set points corresponding to the various operating states. If the controller 18 is operating in the FREQUENCY CONTROL MODE, then the field adjustment circuitry will allow for adjustment of the frequency setpoints corresponding to the various operating states.

Because the controller 18 will, in certain embodiments, be a digital controller, the field adjustment circuitry may take the form of a digital communications interface that would allow an installer, technician or user to couple a digital communications device (e.g., a laptop computer) to the interface. This embodiment, however, requires that the installer, technician or user have access to relatively sophisticated equipment and an understanding of how to use such equipment. Accordingly, for some applications a lower cost, simpler approach is desirable where few—if any—tools will be required on the part of the installer, technician or user to provide field adjustment of the setpoints corresponding to the operating states.

Figure 9A:
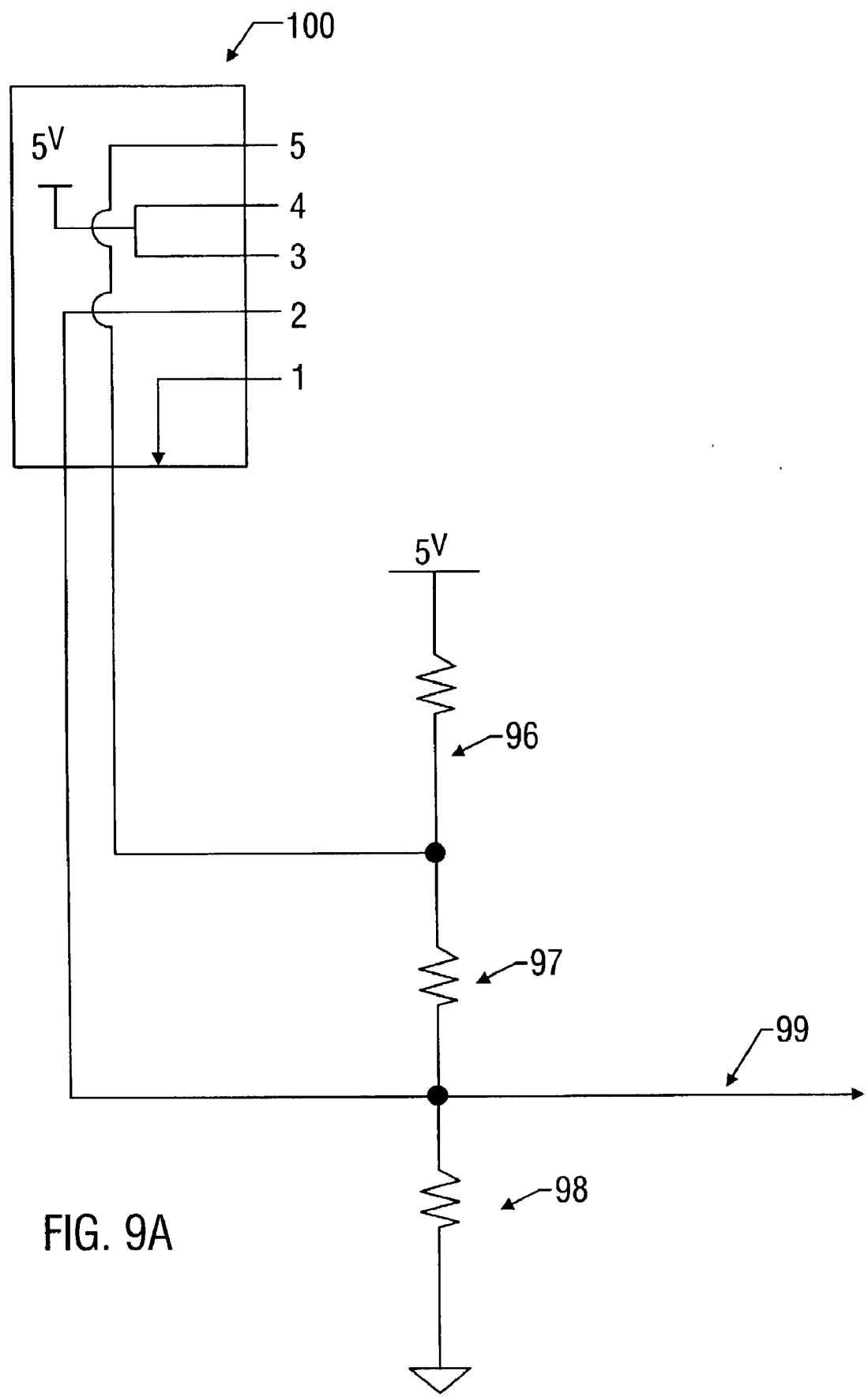
FIGS. 9A-9C illustrate in greater detail one exemplary configuration of the field adjustment circuits of FIGS. 3A and 3B.

One embodiment for illustrating such an elegant, essentially tooless, approach for providing field adjustability of the setpoints is illustrated in FIG. 3B and FIG. 9A. In the exemplary embodiment of FIG. 3B, there are five possible operating states. Accordingly, there are five dedicated field adjustment circuits 91, 92, 93, 94 and 95, one for each of the possible operating states. As described above, each operating state may correspond to a specific setpoint which—depending on the operation mode of the controller 18—can be a current setpoint, a frequency setpoint, a speed setpoint or a CFM setpoint. For purposes of the present discussion, it will be assumed that the controller is operating in FREQUENCY CONTROL MODE although it will be appreciated that the setpoints could, for example, refer to a desired current setpoint of the controller 18 operating in the CURRENT CONTROL MODE.

Referring to FIG. 3B, each of the field adjustment circuits 91, 92, 93, 94 and 95 comprises a string of series connected resistors coupled across a defined voltage and a set of jumpers that include taps coupled at various points in the resistor chain. FIG. 9A illustrates in greater detail one of the field adjustment circuits.

Referring to FIG. 9A, the exemplary field adjustment circuit includes three series connected resistors 96, 97 and 98 coupled across a 5V bus. The voltage level at one point of resistor 98 is output on line 99 as the output voltage of the field adjustment circuit. The points where the resistors are coupled together are provided as inputs to a jumper box 100 that provides, in the illustrated example, five access points to which jumpers may be coupled.

As those of ordinary skill in the art will appreciate, the voltage level at the output 99 will be dependant on the manner in which jumpers are positioned within the jumper box 100. Thus, by manipulating the placement of jumpers in the jumper box, it is possible to adjust the output voltage at point 99 and, thus, provide different field adjustment signals.

Figure 9B:
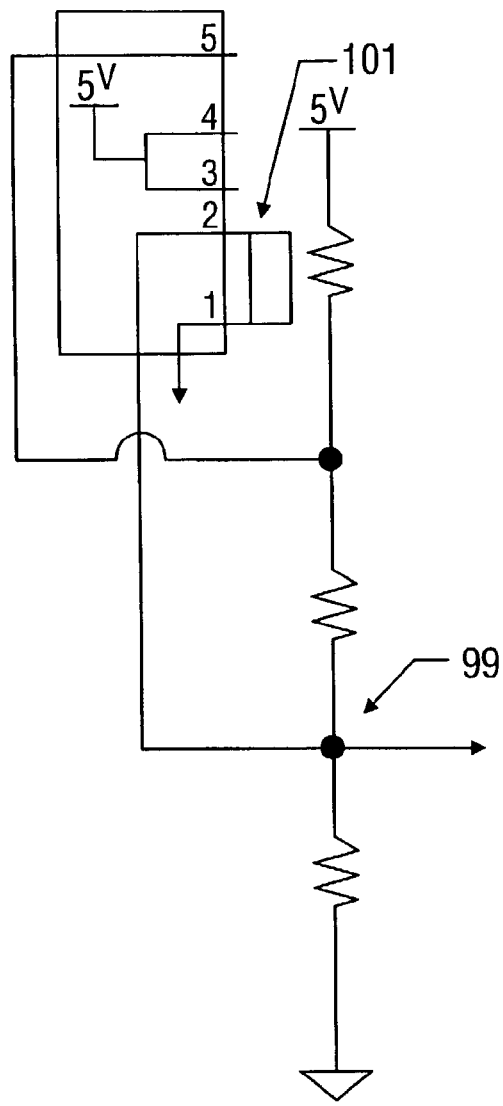
Figure 9C:
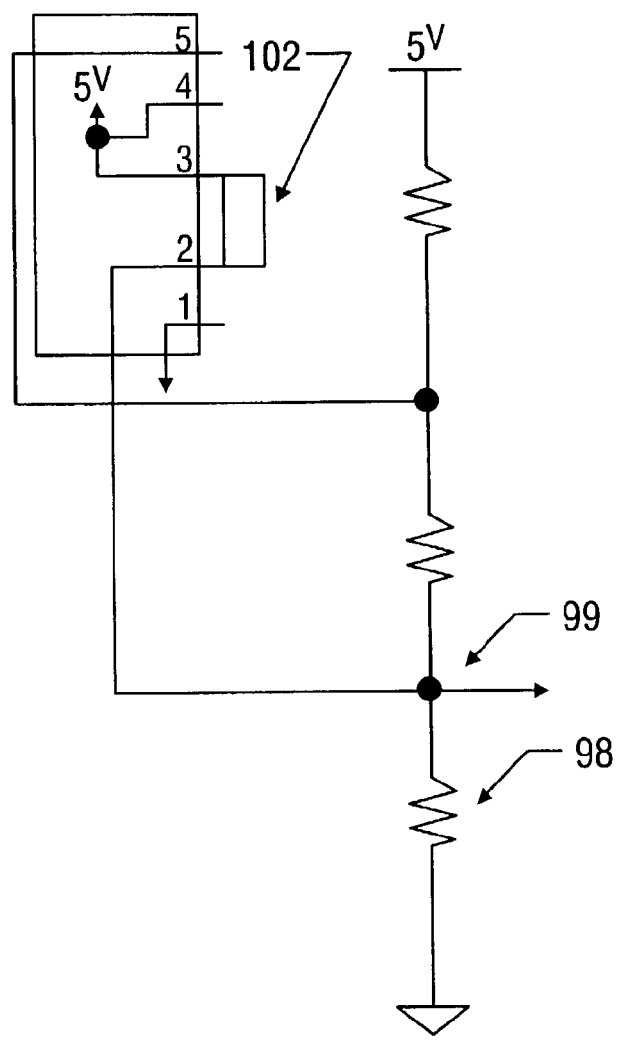

For example, if a jumper 101 is positioned to couple Pin #1 (which is coupled to ground) to Pin #2 (which is coupled to the output 99), the output voltage on the output line will go to ground, thus providing one level of field adjustment. This is generally illustrated in FIG. 9B. Alternately, if a jumper 102 is positioned to couple Pin #2 to Pin # 3 (which is connected to +5 V), the voltage level at point 99 will rise to the 5V logic supply level and this will define a second field adjustment. This is generally illustrated in FIG. 9C. Still further, if a jumper is provided to couple Pin #5 to Pin #4, 5V will be provided across resistors 97 and 98 only and the output voltage at point 99 will take a third state defining a third field adjustment. Finally, if no jumpers are employed, the voltage at point 99 will correspond to the voltage at point 99 when 5V is applied across the entire resistor chain 96, 97 and 98 thus defining a fourth field adjustment. Thus, through the relatively simple circuitry of FIGS. 3B and 9A simple, tooless field adjustments can be made to generate one of four field adjustment signals.

The field adjustment signals from the field adjustment circuits 91-95 may be processed by the controller 18 in a variety of ways to adjust the setpoints for the various operating state. In one embodiment, the controller may be programmed to sample the value of the field adjustment signal for each operating state and, for each sampled value, adjust the initially established setpoint for that operating state up or down by a predefined amount. Alternate embodiments are envisioned wherein the field adjustment signals are used to select one of a number of possible predefined setpoints for that operating state. This embodiment is beneficial in the respect that it ensures that, regardless of the type of field adjustments that are made, the controller 18 will be controlling the system to a known defined setpoint. By ensuring that the controller 18 will always control the system to a limited number of defined setpoints, it is possible to optimize the system (e.g., by winding the motor to operate efficiently at the predefined setpoints). It is also possible to reduce the complexity and costs of the controller because the controller will only need to control the system to a limited number of defined setpoints.

Embodiments are envisioned wherein, for each operating state, several unique setpoints are provided. Thus, in the example of FIGS. 3B and 9A, where there are five operating states and each field adjustment circuit is capable of providing one of four field adjustment signals, the total number of possible predefined operating states is 5×4 or 20. While such an embodiment may have advantages, it is possible to reduce the complexity of the system by limiting the total number of available setpoints to something less than the total number of possible states and having some of the potential operating states overlap. One embodiment of a control scheme that implements such an approach is illustrated in FIG. 10.

Figure 10:
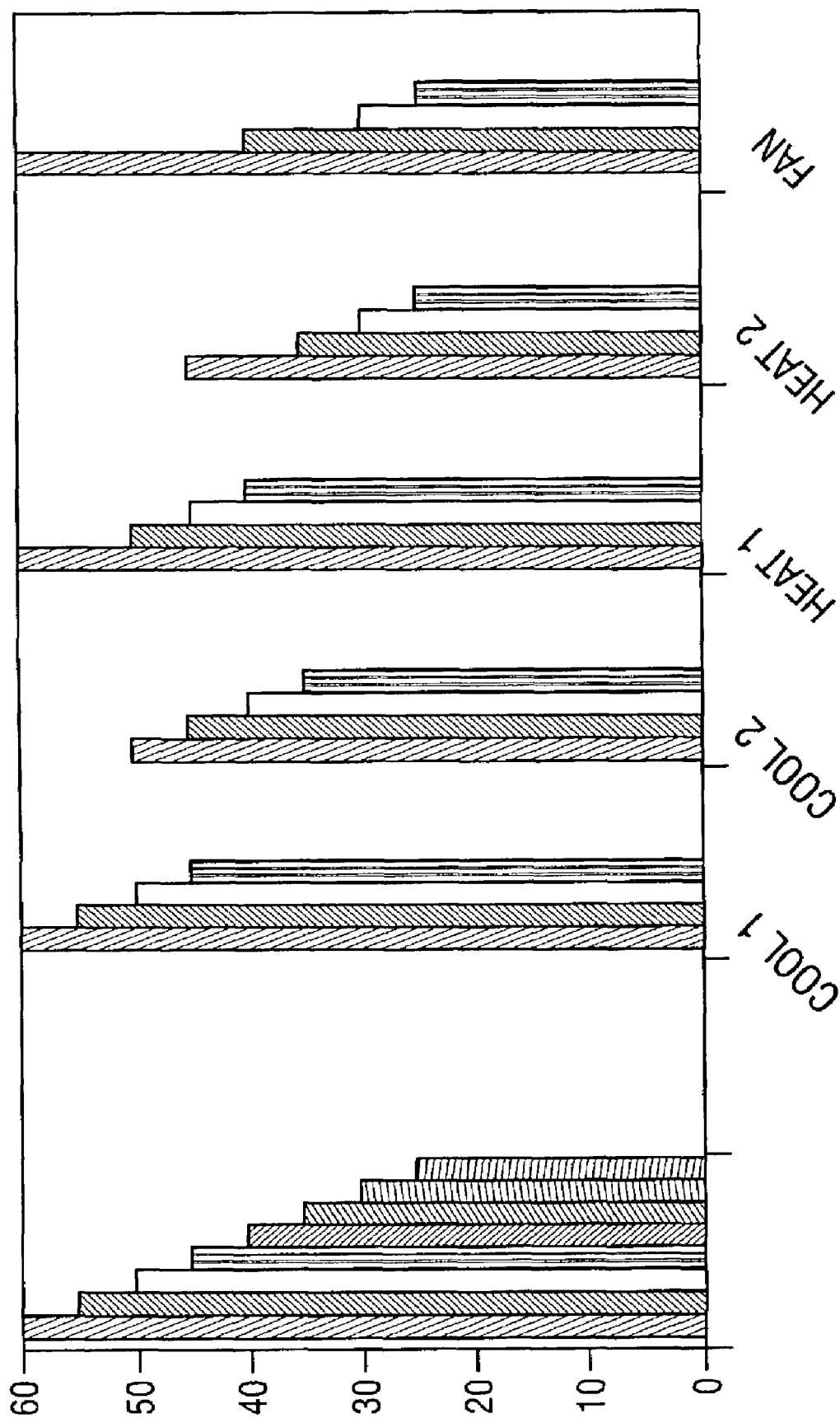
FIG. 10 illustrates an exemplary control scheme that may be implemented by the controller 18 of FIGS. 3A and 3B.

FIG. 10 illustrates a control scheme that may be implemented by controller 18 when the controller is operating in the FREQUENCY CONTROL MODE, although it will be appreciated that the same control scheme can be used in the other operating modes.

Referring to FIG. 10, the leftmost grouping of lines represents the total number of setpoints at which the controller 18 is programmed to operate. In the illustrated example, the controller 18 has been programmed to operate at eight possible frequency setpoints (60 Hz, 55 Hz, 50 Hz, 45 Hz, 40 Hz, 35 Hz, 30 Hz, and 25 Hz) Thus, the controller 18 and the remaining circuitry of the system 1—including the PSC motor 2—can be optimized to run at only these eight frequencies. The grouping of lines to the right represent the possible setpoints for the available operating states. In the illustrated example, there are five possible operating states (COOL 1, COOL 2, HEAT 1, HEAT 2 and FAN). Each of the five operating states has associated with it four possible frequency setpoints. For example, the COOL 1 operating state corresponds to possible frequency setpoints of 60 Hz, 55 Hz, 50 Hz, and 45 Hz. The FAN operating state, in turn, corresponds to possible frequency setpoints of 60 Hz, 40 Hz, 30 Hz, and 25 Hz.

In the illustrated example, each of the four possible frequency setpoints will correspond to one of the possible field adjustment signal values. Thus, if the logic level control signals indicate that the controller 18 is to be in the FAN operating state, the controller 18 will sample the field adjustment signal corresponding to the FAN operating state. Depending on which of the four possible values that field adjustment signals takes, the controller 18 will select one of the four available setpoints and control the output of the inverter to that setpoint. The same control function would occur if a different operating state was selected.

While the above has been described in terms of controller 18 operating in the FREQUENCY MODE, the same control scheme could be used in different modes. In such different modes, the predefined setpoints could correspond, for example, to current levels, CFM levels, or power levels. In any of these cases, if the approach of FIG. 10 is used, the system can be optimized to run at the limited number of defined set points.

While the above discussion discusses field adjustment in the context of adjusting the setpoint values, other forms of field adjustment are envisioned. For example, it may be possible to develop a single controller 18 that can drive both 1 Hp and ½ Hp motors. In such an embodiment, it may be desirable to provide a motor selection circuit as provided to allow the installer of a HVAC system as describe herein to select the type of motor that will be coupled to the system. For example, if the controller 18 can work with ½ Hp and 1 Hp motors, a jumper may be provided that, depending on the state of the jumper, will allow the controller to optimally control either a ½ Hp or a 1 Hp motor. Alternate embodiments are envisioned wherein switching elements other than jumpers (e.g., DIP switches) are used to allow for field configuration for a larger number of motors. Still further field adjustment circuits are envisioned for allowing an installer, technician or user to set the operating mode of the controller 18.

In addition to controlling the motor 2 during normal operation to operate in a manner consistent with the then-current setpoint (as defined by the input control signals and as adjusted by the field adjustment signals), the controller 18 can also implement specialized control routines during start-up of the motor (i.e., when the motor goes from an unenergized state to an energized state).

There are several beneficial methods that the controller 18 may implement to start the PSC motor 2 from a stopped or standstill state.

Figure 11:
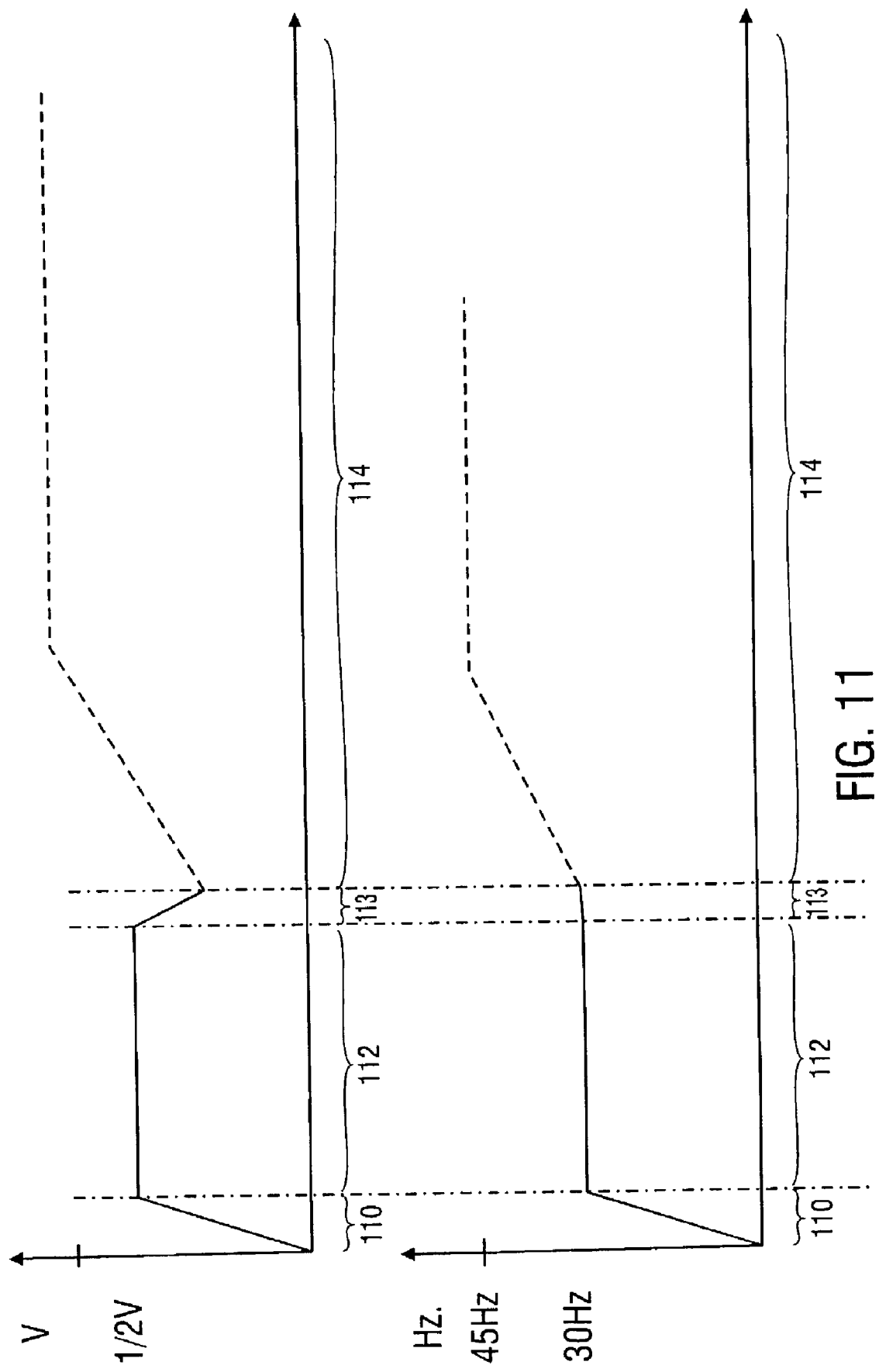
FIG. 11 generally illustrates an exemplary during a startup operation that may be implemented by the controller 18 of FIGS. 3A and 3B where the PSC motor 2 goes from an off state to a running state, and where the voltage and frequency output of the inverter 4 are controlled from a predetermined frequency to provide optimum starting of the motor.

In one exemplary approach, illustrated generally in FIG. 11, during a start-up operation where the PSC motor 2 goes from an off state to a running state, the voltage and frequency output of the inverter will be controlled from a predetermined frequency to provide optimum starting of the motor. In this embodiment, upon the detection of a startup operation (i.e., upon the detection that the motor is being started from a stopped or standstill state), the controller will provide an output voltage that initially ramps up very rapidly (region 110) (almost instantaneously) in a linear manner from zero volts and zero hertz to a magnitude corresponding to between 30%-70% of the available bus voltage (in one embodiment approximately half of the available bus voltage) and a frequency equal to approximately 30 Hz (approximately half of the line frequency). Notably, at the 30 Hz point during start-up, the output voltage (half of the available bus voltage (50-60V)) will be higher than the output voltage that would correspond to a 30 Hz output frequency during normal operation. Once the output frequency reaches the approximately 30 Hz point, the frequency and magnitude of the inverter output voltage are, in this approach, maintained constant for a defined period of time (e.g., 5 seconds)(region 112). After remaining at the start-up voltage magnitude corresponding to 30 Hz for the defined period of time, in which approach, the controller 18 will cause the voltage magnitude to drop to the normal operating voltage at 30 Hz for the operating state under which the controller is operating (region 113) and then adjust the output of the inverter to reach the desired frequency output and the voltage magnitude corresponding to the then present operating state is in accordance with the volts/hertz curve for that operating state. This is reflected by the dotted line in FIG. 11 (region 114) where (in the example) the ultimate inverter output is near the 75% of maximum voltage and the output frequency at that voltage level is near 45 Hz. Notably, while the voltage frequency and magnitude have a linear relationship during the normal operating mode, the rate of change of the voltage over the rate of change of the frequency is significantly lower than for the start-up mode.

It is believed that the fast increase in the voltage during start-up to a relatively high "start-up" value at a selected start-up frequency (e.g., 30 Hz), and the maintenance of the voltage at this start-up value and frequency for a predetermined period of time and an adjustment of the voltage to a value for the start-up frequency that is less than the start-up voltage and thereafter varying the voltage/frequency in a linear manner, softly starts the motor in a manner that is safe, that does not put undue strain on the motor or the inverter, and that is quiet.

While the start-up approach described above is believed to provide certain benefits, for certain applications the starting torque available from that approach is insufficient to start the motor 2 in a desirable manner. In such applications, an alternate starting approach is often desirable.

Because the amount of starting torque will vary with the amount of current flowing through the auxiliary windings of the PSC motor 2 (i.e., the winding that is coupled in series with the capacitor), the alternate approach controls the energization of the motor to place a larger share of the current in the auxiliary windings upon start-up and, therefore, produce a relatively large amount of starting torque. This is accomplished by controlling the frequency of the voltage applied to the motor during start-up. As those of ordinary skill in the art will appreciate, the impendence of a capacitor is less for a high frequency voltage signal than for a lower frequency voltage signal. Thus, by increasing the frequency of the applied voltage during start-up, it is possible to decrease the apparent impedance of the auxiliary winding and, therefore, increase the current flowing in the auxiliary winding and, therefore, the starting torque.

Figure 12:
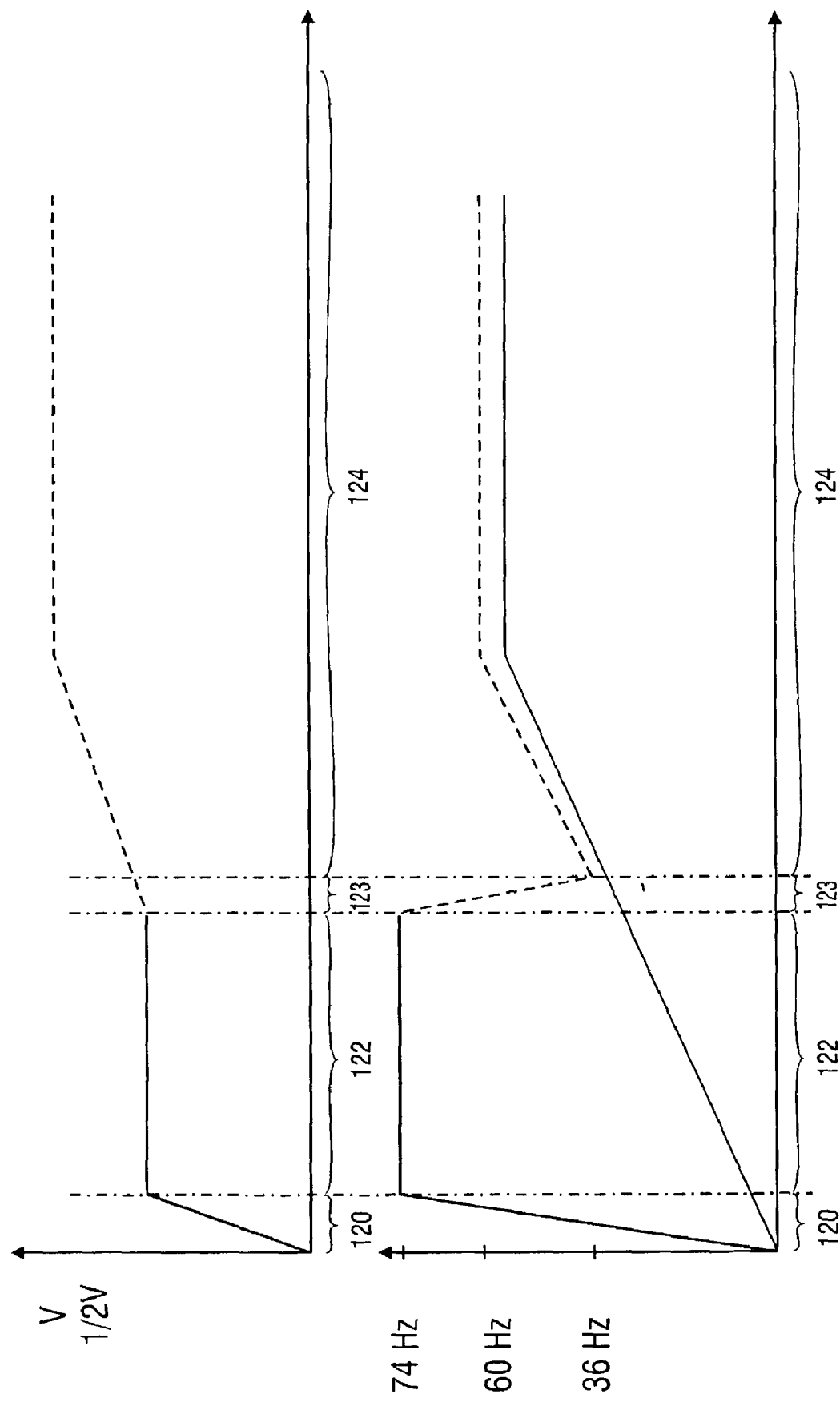
FIG. 12 generally illustrates an alternate exemplary startup process in which the frequency output of the inverter is driven to above line frequency during start-up.

An exemplary start-up process in which the frequency output of the inverter is driven to above line frequency during start-up is illustrated generally in FIG. 12.

Referring to FIG. 12, a start-up process is illustrated wherein, during start-up, the controller 18 will rapidly bring the inverter output to a voltage magnitude level that is somewhere between approximately 30% and 70% of the available voltage (for example—in one embodiment—to a near half voltage level, 50-60V) but to a relatively high frequency value that is above the line frequency value such as, for example, 74 Hz (region 120). The output for the inverter will remain at this relatively high frequency and at the half voltage level for a predetermined period of time (e.g., five seconds)(region 122) and will, thereafter, go to approximately one-half line frequency (e.g. to about 36 Hz.) and then immediately ramp in a linear manner to the output defined by the current operating state and mode of the controller 18. The inverter output is brought to approximately half line frequency (36 Hz.) in this process because, during startup the motor is still coming up to speed and allowing the motor to lock-in at approximately 2 line frequency is believed to be beneficial.

In the embodiment of FIG. 12, the controller 18 will monitor the current flowing through the lower leg of the inverter using the circuitry described above (or some other signal that will indicate whether the motor is turning) and if the monitoring indicates that the motor was not properly started it will then initiate a secondary start operation where the output of the inverter is rapidly brought back to the approximately ½ voltage and 74 Hz output level and maintained at that level for longer period of time than it was during the initial starting operation (e.g., for a period of 20 seconds). The controller 18 will then ramp the output to the output corresponding to the operating state and operating mode of the controller. If the monitoring of the current (or other data reflecting the motor operation) indicates that the motor was not properly started, the secondary start operation will be repeated.

Through the use of the above-line frequency starting method described above, faster and better motor starting is believed to be possible.

In addition to controlling the operation of the inverter so as to provide desired control of the PSC motor 2 during start-up and normal operation, the controller 18 may also be used to control relay 6 to essentially bypass the inverter and couple the input terminals of the PSC motor directly to line power. This capability potentially provides for relatively high efficiency operation at outputs at or near line frequencies because the losses caused by the inverter (e.g., switching losses, etc.) are not incurred when the motor 2 is running directly off the line.

In the example of FIG. 3B, the controller 18 determines the state of the relay 6 through the utilization of a switching circuit 130 in the form of a power transistor that is coupled in series with the relay winding across a voltage supply. The gate drive of the transistor is coupled to an output of the controller 18 such that by changing the state of the relevant output, the controller can selectively switch relay 6 to couple the PSC motor to the inverter 4 or to the line.

In one exemplary embodiment, the controller 18 may be programmed to switch the relay to couple the motor 2 to the line whenever the desired output operating frequency during normal operation meets or exceeds a desired maximum frequency value (e.g., switch to line when the desired output frequency is between 57 Hz and 62 Hz). Alternately, the controller may be programmed to switch to the line only when a particular sequence of the input control signals 12A-12C is detected (e.g., 111). Still further embodiments are envisioned where the controller 18 will switch the relay to drive the motor from the line whenever the frequency is within a pre-defined range or a particular sequence of input command signals 12A-12C is detected.

In one embodiment, whenever the controller 18 is to transfer the motor 2 from the inverter output to the line, the controller 18 will ramp the voltage and frequency output of the inverter to the maximum possible voltage output and maximum frequency and then turn off the energization of the inverter without transferring the motor 2 to the line. The inverter will then remain off, with the relay coupling the motor to the inverter such that the motor remains de-energized for a defined period of time such as, for example, 0.5 seconds. After this defined period of de-energization, the relay will be switched to couple the motor to the line. The use of this period of complete de-energization is believed to provide for a smooth transfer from the inverter 4 to the line. It assures that the relay does not interrupt or break the inverter current. The relay 6 serves to protect the inverter by ensuring a break before make situations such that the inverter is never coupled to the motor when the motor is coupled to the line.

While the above procedure describes the process for transitioning energization of the motor from the inverter to the line, instances will arise where the energization of the motor must be transitioned from the line to the inverter. In accordance with one embodiment, the energization of the motor is transitioned from the line to the inverter in accordance with a controlled process. In this process, before the relay is switched to transfer the energization of the motor from the line to the inverter, the inverter output is brought to a frequency that is very near to line frequency (e.g., 58 Hz) before the motor is transferred to the inverter. However, the magnitude of the voltage of the inverter is controlled such that the voltage magnitude of the inverter is approximately half of the voltage magnitude that would exist at 58 Hz if the motor were being driven by the inverter during normal conditions. When the inverter output is set at a near line frequency (e.g., 58 Hz) and a half-normal voltage magnitude, the motor is then switched from the line to the inverter. The frequency of the inverter is then maintained at 58 Hz and the magnitude of the voltage is rapidly increased from the half-normal voltage level to a voltage level that corresponds to the voltage output at the selected frequency (58 Hz) during normal operation. The voltage and frequency of the inverter are then controlled to take the voltage to the desired output frequency and the corresponding voltage.

It is believed that the reduction in the voltage to half of the normal operating voltage at the inverter transfer frequency, and the quick increase in the voltage up to normal voltage for the transfer frequency, places less strain on the inverter than would a transfer at full voltage and provides for a smoother transition of the motor from line to inverter.

In addition to using the relay 6 to transition the energization of the PSC motor 2 from the inverter 4 to the line, certain embodiments of the present system can use the relay 6 to preclude the inverter 4 and the controller 18 from starting in an unsafe or unstable mode and/or ensure that a failure of the controller 18 and/or the inverter 4 would not completely disable the motor 2, but would instead cause the motor to run off of the line voltage such that if the inverter 4 and/or controller 18 failed, the motor 2 would continue to run.

In one embodiment of such a system the relay 6 may be configured such that, in its normal-unenergized state, the PSC motor is coupled to the line. In this embodiment, the controller 18 can, by energizing the relay, switch the relay 6 such that the motor is connected to the output of the inverter. In this design, if the controller 18 fails, the relay would remain in its normal, unenergized state and would couple the motor 2 to the line. As such, the failure of the controller 18 would result in the PSC motor 2 safely operating off line power.

In an alternate embodiment, the relay 6 may be selected such that the relay, in its unenergized state, couples the PSC motor 2 to the inverter 4. One example of such an embodiment is illustrated in FIG. 13.

Figure 13:
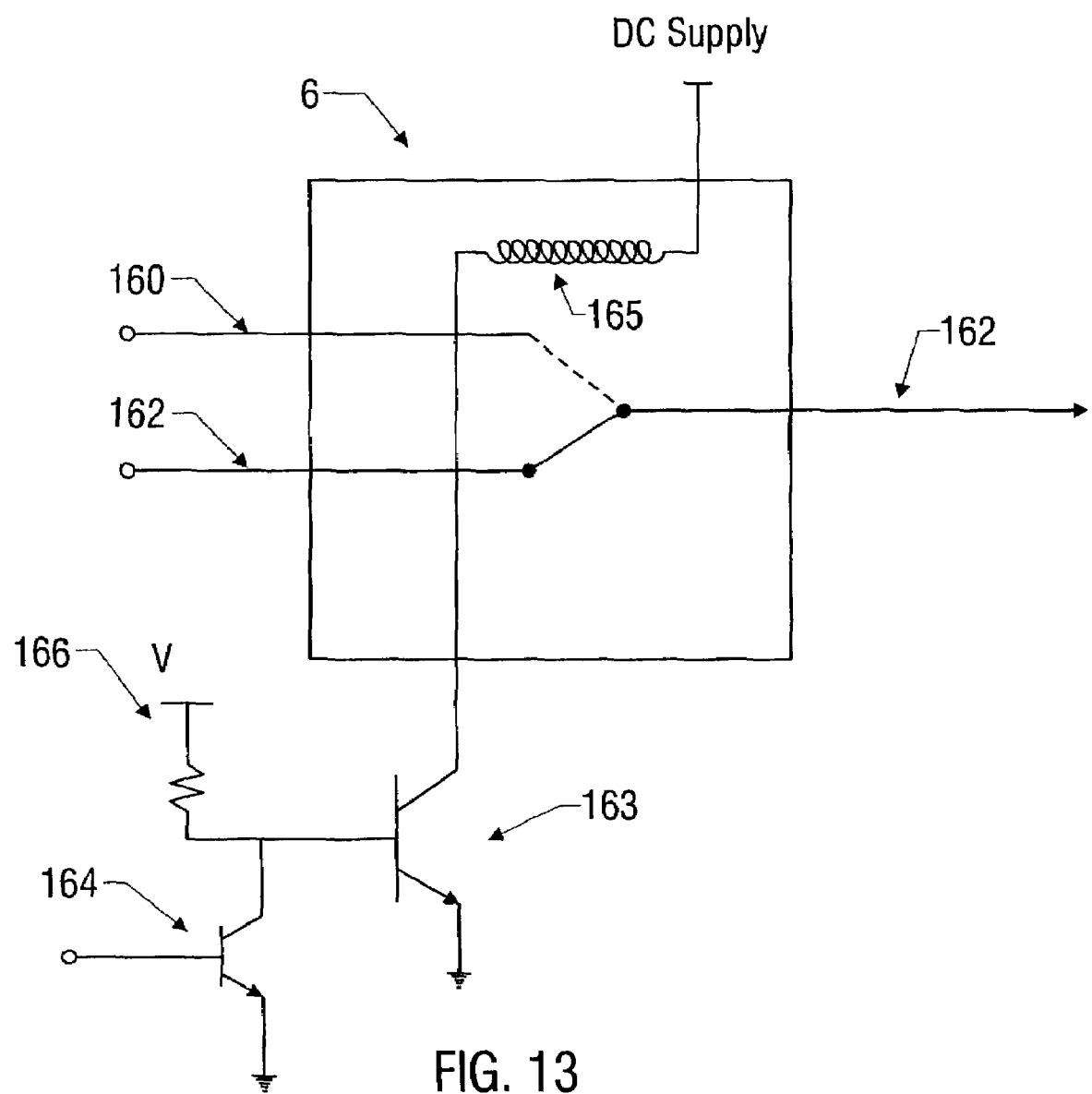
FIG. 13 generally illustrates an exemplary embodiment of the system of FIGS. 3A and 3B wherein the relay 6 is configured such that the relay, in its unenergized state, couples the PSC motor 2 to the inverter 4.

Referring to FIG. 13, a relay 6 is provided that includes an energization coil 165 that is coupled on one end to a source of DC power and on its other end to a switching device 163. The switching device 163 is selected such that, in the presence of an adequate gate voltage, the device 163 will conduct. Line power is provided to the relay on line 160 and the output of the inverter is provided on line 161. The output of the relay 162 is coupled to the PSC motor (not illustrated). The relay is configured such that, when the relay coil 165 is unenergized, the relay will couple the inverter output 161 to the motor lead 162. A second switching device 164 whose gate is coupled to an output of the controller 18 is also provided.

In the illustrated embodiment, the gate of the switching device 163 is coupled to a source of voltage 166 that may be a DC value corresponding to the line voltage. Appropriate step down resistors may be used to provide an arrangement such that, whenever the line voltage is sufficient to drive the motor properly, the transistor 163 will (assuming that device 164 is non-conductive) conduct and energize the relay thus coupling the motor input 162 to the line. Thus, in the absence of the energization of the switching device 164, if the power supplied to the system is sufficient to safely drive the motor 2, the motor will be coupled to the line and will run off of the line.

In the illustrated embodiment, the gate signal for switching device 164 is coupled to an output of the controller 18. Thus, assuming that the voltage 166 is sufficiently high, the status of device 164 will determine the energization source for the motor. If the switching device 164 is conductive, the gate of device 163 will be pulled to ground and the relay coil 165 will be de-energized, thus causing the relay to couple the motor to the inverter output 161. If, however, the switching device 164 is not conductive, then the voltage from point 166 will cause transistor 163 to conduct, thus energizing the relay and coupling the motor to the line. In the described embodiment, the controller 18 is configured such that it will not come on if the power supplied to the controller is inadequate to properly operate the controller 18.

As those of ordinary skill in the art having the benefit of this disclosure will appreciate, if the line voltage is adequate to safely drive the motor, but the controller 18 fails or is not rendered operable, the relay coil 165 would be energized, thus resulting in a safe failure where the motor operated off the line. If, however, the line power was inadequate to properly energize the relay—in which case the power would be inadequate to properly energize the controller/inverter— the relay would become unenergized and the relay would switch to couple the motor to the inverter 4. However, because the controller 18 would be inoperable if such a low voltage condition existed, the inverter 4 would not receive any switching signals and no power would be applied to the motor. As such, this embodiment provides two fail-safe modes: (i) a first mode where the controller fails but the power is adequate to drive the motor where the motor would run off the line; and (ii) a second mode here the controller is inoperable and/or the power was inadequate to drive the motor where the motor would not be energized at all.

In addition to providing for safe failures in the event of inadequate supply voltage or failure of the controller 18, the system 1 of the present disclosure may be configured to protect or reset the controller in the event that the logic supply level is not appropriate or that excessive currents are detected in the inverter. Such protection circuitry may take the form of the protection circuit 170 illustrated in FIG. 3B.

Referring to FIG. 3B, protection circuit 170 comprises a switching device 171 that is coupled to a reset pin of the controller 18 at one terminal and to ground on the other terminal. The device 171 is configured such that if the device 171 is rendered conductive, the reset pin of the controller 18 will be pulled to ground, thus resetting the controller 18.

The conductivity of the device 171 is determined by the gate voltage of the device. The gate voltage of device 171 is, in turn, determined by a variety of input signals. For example, in the embodiment of FIG. 3B the gate of device 171 is coupled to the CURRENT TRIP output 65 that monitors the current in the lower leg of the inverter. Thus the detection of a high current in the lower leg of the inverter will cause the controller 18 to reset. The gate of the switching device 171 is also coupled to the output of an upper current trip circuit 172 that is illustrated in more detail in FIG. 14.

The upper trip circuit 172 is used in the embodiment of FIG. 3B because the inverter 4 of FIG. 3B is based on the use of a voltage doubler such that positive and negative voltage rails are provided. When the inverter 4 is switched such that the negative rail of the inverter is powering the motor 2, the current can be detected using the circuitry of FIG. 6. When the positive rail of the inverter is powering the motor, however, the circuitry of FIG. 6 will not detect the current actually flowing to the motor 2. Accordingly, in the embodiment of FIG. 3B additional circuitry 172 is provided to detect the excessive current in the upper leg of the inverter.

Figure 14:
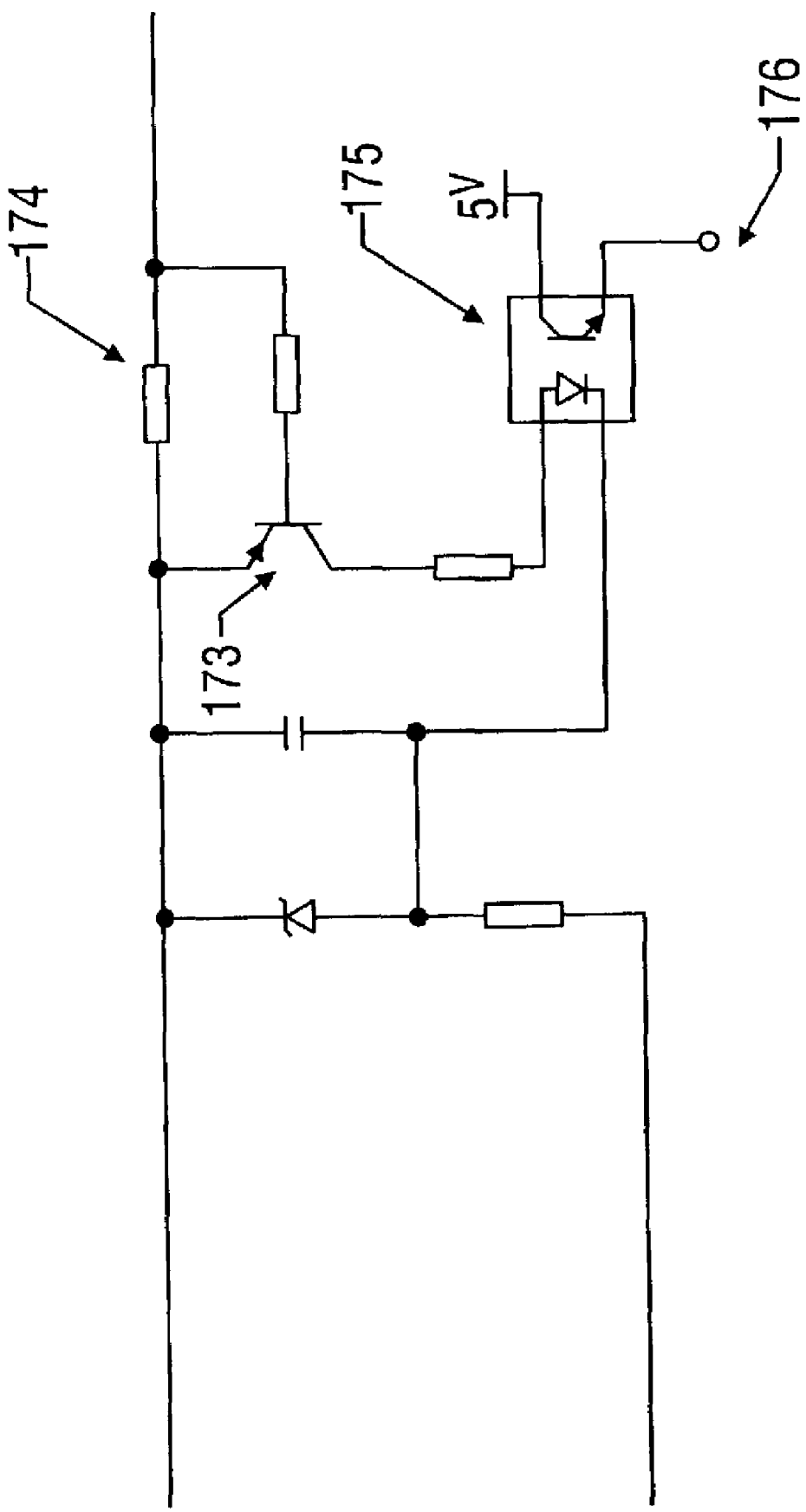
FIG. 14 generally illustrates an exemplary embodiment of an upper current trip circuit than may be used with the system of FIGS. 3A and 3B to monitor the current in the upper leg of the inverter.

Referring to FIG. 14 the upper current detection circuitry 172 comprises a switching device 173 and a shunt resistor 174. The shunt resistor is coupled across one terminal and the gate of the switching device 173. Accordingly, the switching device 173 will be rendered conductive whenever the voltage across the shunt resistor 174 exceeds a predetermined value. Since the voltage across the resistor 174 will correspond to the current flowing through the resistor 174, the switching device 173 will, thus, be rendered conductive whenever the current in the upper leg of the inverter exceeds a predefined value. The upper trip circuit also includes an optocoupler 176 having an output 176. Whenever the transistor 173 is rendered conductive, the optocoupler 175 will conduct and a pulse will be generated at the output 176 of the optocoupler.

Referring back to FIG. 3B and the protection circuitry 170, it will be noted that the output of the optocoupler 176 (UT) is coupled to the gate of switching device 171. Thus, whenever the upper current detection circuit detects an excessive inverter current, transistor 171 will conduct and the controller 18 will be reset.

The gate of switching device 171 is also coupled to the output of a differential amplifier 177 configured as a comparator that compares the 15 volt gate drives supply voltage to the logic supply voltage. Whenever the comparator 177 indicates that the gate driver supply voltage is insufficient or below an acceptable level for safe operation of the inverter the switching devices, switching device 171 will be rendered conductive, thus resetting the controller 18.

A still further fail-safe mode is envisioned wherein the controller 18 monitors the current from the inverter and, if during normal operation where current should be flowing to the motor, the controller 18 detects that either no current or very little current is going to the motor but the control inputs are calling for energization of the motor, the controller 18 would generate control signals to operate the relay 6 to connect the motor to the line power. In one exemplary embodiment, the relay 6 is switched by the controller 18 to couple the motor to line if the output current of the inverter remains below a minimum value for a period of time of between 1 to 5 seconds despite the fact that the inputs are calling for an operating state where some current is to be provided to the motor. This fail-safe mode could allow continued operation of the motor in circumstances where a failed driver IC or other component failure would otherwise keep the relay 6 in a state coupling the motor to the inverter, but where the inverter could not provide the output current when it is required.

Once the controller 18 has initiated appropriate start-up of the motor, and assuming that no faults are detected such that the controller 18 is reset, the controller 18 will determine a desired output voltage and frequency as described above and will produce a pulse width modulated (PWM) output having a duty cycle that—when applied through driver circuitry in the inverter to the inverter switching devices—will produce a synthesized sinusoidal voltage signal at the output of the inverter.

Such switching may be accomplished by having an eight-bit lookup sine table with, for example, 256 stored points stored in a ROM within or accessible by he controller. The synthesized sinusoidal AC voltage output at the inverter may be established by changing the PWM duty cycles of the switching signals to have the general shape of a sine wave. The PWM duty cycle for any given point will be based on the value of the sine wave at that point. Thus, a 100% duty cycle (the maximum voltage) will correspond to the peak of the sine wave while a 50% duty cycle will correspond to the zero crossing of the sine wave and a 0% duty cycle will corresponds to the negative peak of the sine wave.

The inverter 4 may take the form of an inverter based on a voltage doubler—such as the inverter 4 of FIG. 3B—where individual switching devices are provided for generating the positive and negative portions of the output sine wave. Appropriate driver circuitry may be provided to convert the PWM signal from the controller 18 to drive signals for the voltage doubled inverter.

Alternate embodiments are envisioned wherein the inverter does not use a voltage doubler, but instead uses a single DC buss obtained by full wave rectifying the input line voltage. The input line voltage may be, for example, 115 VAC or 230 VAC. Such an embodiment is schematically illustrated in FIG. 15.

Figure 15:
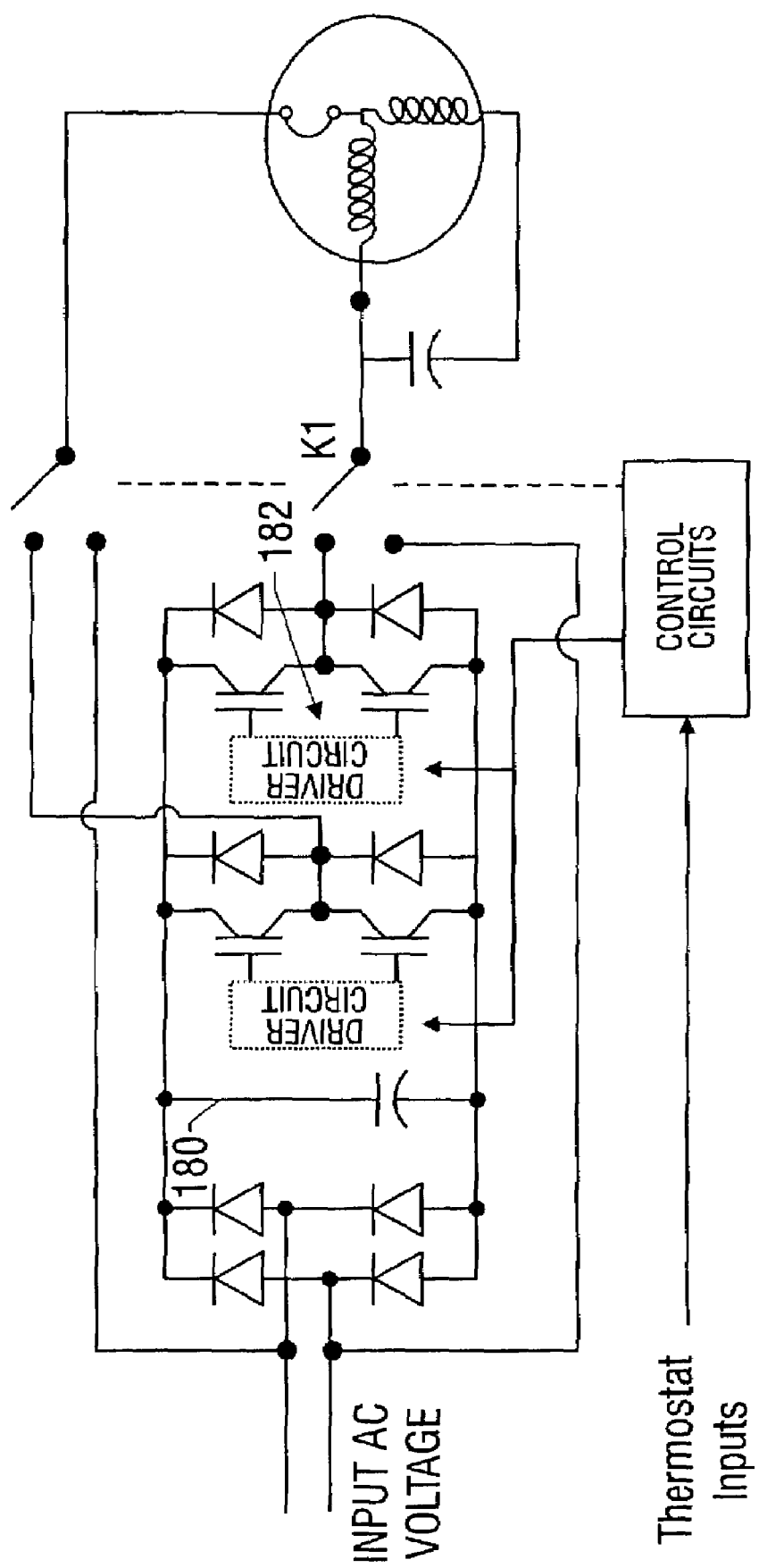
FIG. 15 generally illustrates alternate embodiments of the system of FIGS. 3A and 3B where the inverter operates off of a single DC buss obtained by full wave rectifying the input line voltage.

Referring to FIG. 15, a controller 18 provides PWM drive signals (generated as described above) to drive circuits 181 and 182 which, in turn, drive sets of power switching devices. The power switching devices (which may be power switching devices such as IGBT's) are coupled to provide the DC buss of the inverter across the terminals of the PSC motor so as to generate positive or negative voltages. The use of such inverter circuitry is known in the art and will not be further discussed herein. As those of ordinary skill in the art will appreciate such switching devices will include or require free wheeling diodes.

The exemplary motor control system described herein may take the form of a separately mounted control module (that will include the inverter and control circuitry) and a PSC motor. The motor may be mounted inside a blower wheel and the controller may be mounted elsewhere in the blower cabinet, preferably in a location where it can utilize some of the airflow from the blower to minimize the rise of the heat sink temperature of the controller. The motor leads should be adequately sized to directly connect to the output terminals of the control module. The controller may be energized by directly connecting the controller module power input to normal household 115 VAC or to 230 VAC power depending on whether the end application is a furnace or a conventional air handler.

Figure 16A:
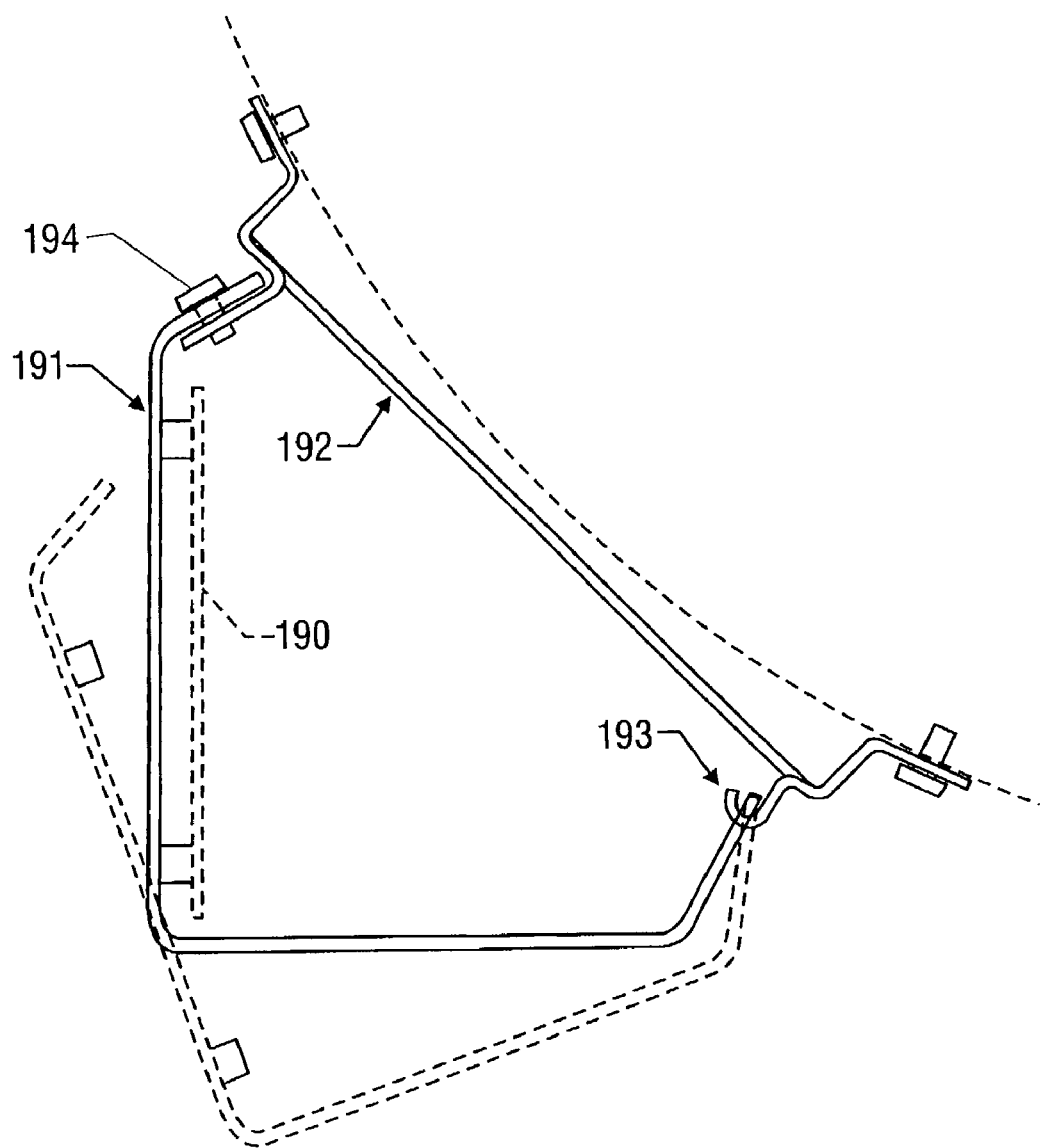
FIGS. 16A-16C generally illustrate an exemplary mounting structure that may be used with the control system of FIGS. 3A and 3B wherein a control module of the system 1 (which includes all major components of the system except for the motor) is mounted within a bracket like device that may be readily secured to a blower enclosure.

In one exemplary embodiment, the control module of the system 1 (which includes all major components of the system except for the motor) is mounted within a bracket like device that may be readily secured to a blower enclosure. Such an embodiment is generally illustrated in FIG. 16A where the control module 190 is positioned within a generally L-shaped bracket assembly that is hingedly coupled to a lid element 192. The lid element 192, in turn, is mounted to the curved exterior of a blower housing by, for example, screws.

Figure 16B:
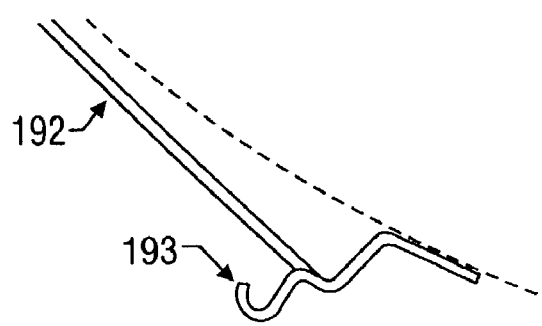

In the embodiment of FIG. 16A, the bracket 191 is coupled to the lid 192 through the use of slot openings in the bracket 191 and hooks 193 in the lid 192. Details of one such hook are provided in FIG. 16B. In general, the hooks 193 are passed through the bracket 191 such that the bracket 191 may be maintained in two positions. In a closed position the bracket 191 is affixed to the lid by a screw or bolt 194. In this position access to the control board 190 is precluded. In the other position, when screw 194 is removed, the bracket 191 can "swing open" to the position corresponding to the dotted lines of FIG. 16A thus providing access to the board 190.

Figure 16C:
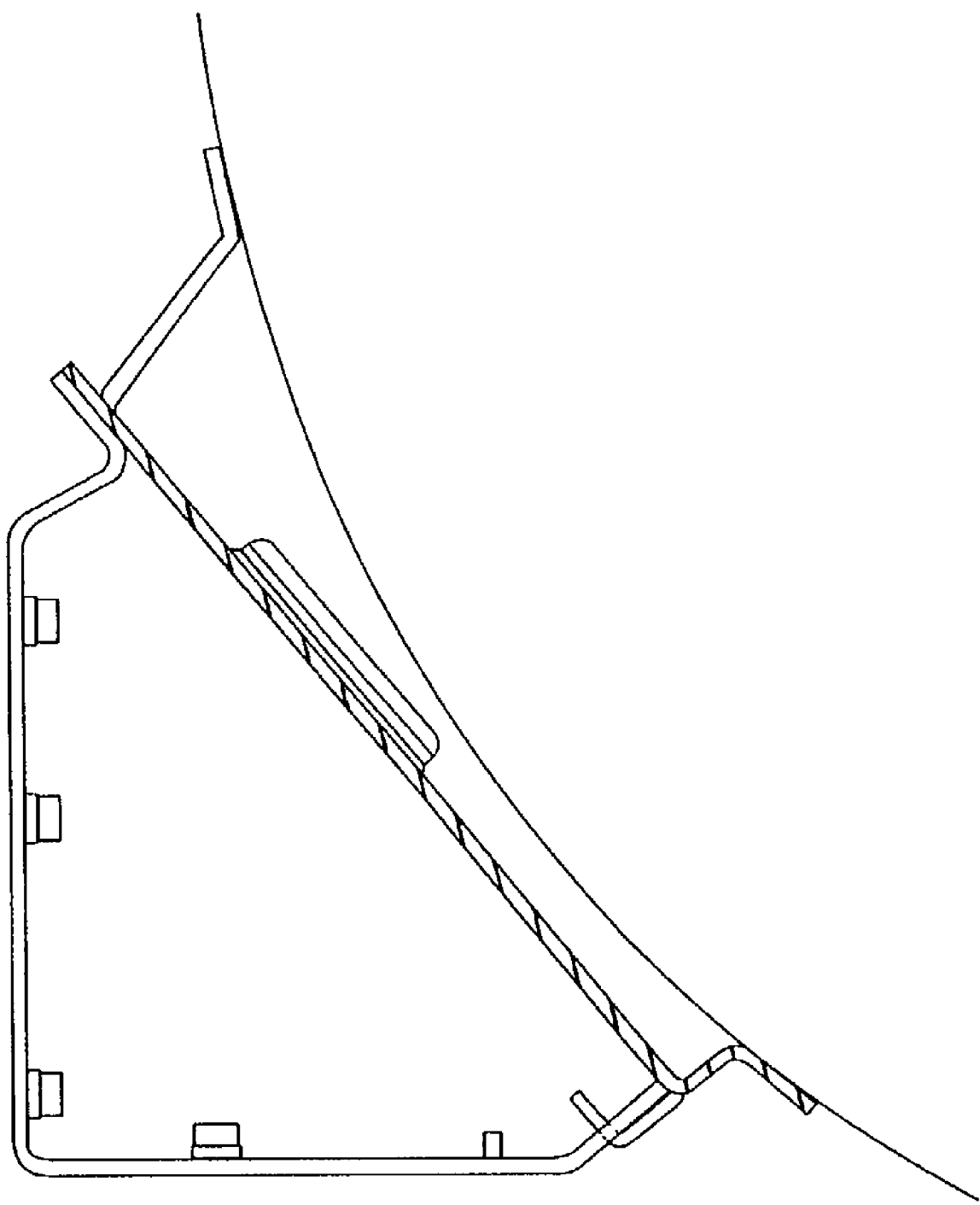

In alternate embodiments, the hooks 193 may be replaced by tabs. Such an alternate embodiment is illustrated generally in FIG. 16C.

The use of the mounting structure of FIGS. 19A and 19B is believed to provide a compact, elegant mounting structure that is not prone to vibrations that could produce unwanted noise.

While the apparatus and methods of this invention have been described in terms of preferred embodiments, it will be apparent to those skilled in the art that variations may be applied to the process described herein without departing from the concept and scope of the invention. All such similar substitutes and modifications apparent to those skilled in the art are deemed to be within the scope and concept of the invention.

What is claimed is:

1. A field adjustable motor control system comprising:
    a motor;
    an inverter coupled to provide energization to the motor;
    a controller coupled to the inverter, the controller providing signals to control the output of the inverter in response to received input control signals and in response to field adjustment signals, wherein the input control signals define a first and a second operating state of the controller, each of the first and second operating states corresponding to a desired operating state of the system;
    a first field adjustment circuit for providing a first field adjustment signal to the controller, the first field adjustment signal, in combination with the input control signals, defining a desired output parameter of the inverter for the first operating state; and
    a relay coupled at its inputs to a source of line power and to the output of the inverter and at its output to the motor, the relay receiving control signals from the controller and being configured such that, in the event of a failure of the controller, the relay will couple the line power to the motor.

2. The field adjustable motor control system of claim 1 wherein the first field adjustment circuit may be modified in the field to provide one or more potential first field adjustment signals.

3. A field-adjustable motor control system comprising:
    a motor;
    an inverter coupled to provide energization to the motor;

a controller coupled to the inverter, the controller providing signals to control the output of the inverter in response to received input control signals and in response to field adjustment signals, wherein the input control signals define a first and second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state; and a relay coupled at its inputs to a source of line power and to the output of the inverter and at its output to the motor, the relay receiving control signals from the controller and being configured such that, in the event of a failure of the controller, the relay will couple the line power to the motor, wherein:

the controller is a digital controller;

the controller is configured such that the first operating state is associated with a plurality of potential control set points for the inverter; and the first field adjustment signal determines the particular control set point to which the inverter is controlled in response to the controller's receipt of input control signals corresponding to the first operating state.

4. The field adjustable motor control system of claim 3 where the plurality of control set points corresponds to desired output current levels.

5. A field-adjustable motor control system comprising:

a motor;

an inverter coupled to provide energization to the motor;

a controller coupled to the inverter, the controller providing signals to control the output of the inverter in response to received input control signals and in response to field adjustment signals, wherein the input control signals define a first and a second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state;

a relay coupled as its inputs to a source of line power and to the output of the inverter and at its output to the motor, the relay receiving control signals from the controller and being configured such that, in the event of a failure of the controller, the relay will couple the line power to the motor; and a second field adjustment circuit for providing a second field adjustment signal to the controller, the second field adjustment signal, in combination with the input control signals, defining a desired output parameter of the inverter for the second operating state;

wherein the controller is a digital controller;

wherein the controller is configured such that the first operating state is associated with a plurality of potential control set points for the inverter and the second operating state is associated with a plurality of potential control set points for the inverter;

wherein the first field adjustment signal determines the particular control set point to which the inverter is controlled in response to the controller's receipt of input control signals corresponding to the first operating state and the second field adjustment signal determines the particular control set point to which the inverter is controlled in response to the controller's receipt of input control signals corresponding to the second operating state; and wherein there is at least some overlap of the potential set points associated with the first operating state and the potential set points associated with the second operating state.

6. A field-adjustable motor control system comprising:

a motor;

an inverter coupled to provide energization to the motor;

a controller coupled to the inverter, the controller providing signals to control the output of the inverter in response to received input control signals and in response to field adjustment signals, wherein the input control signals define a first and a second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state; and a relay coupled at its inputs to a source of line power and to the output of the inverter and at its output to the motor, the relay receiving control signals from the controller and being configured such that, in the event of a failure of the controller, the relay will couple the line power to the motor, wherein the first field adjustment circuit may be modified in the field to provide one or more potential first field adjustment signals, and wherein the field modification is accomplished by the positioning of one or more jumpers within the first field adjustment circuit.

7. A field-adjustable motor control system comprising:

a motor;

an inverter coupled to provide energization to the motor;

a controller coupled to the inverter, the controller providing signals to control the output of the inverter in response to received input control signals and in response to field adjustment signals, wherein the input control signals define a first and a second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state; and a relay coupled at its inputs to a source of line power and to the output of the inverter and at its output to the motor, the relay receiving control signals from the controller and being configured such that, in the event of a failure of the controller, the relay will couple the line power to the motor;

wherein the relay includes a coil and, when the relay coil is unenergized, the relay couples the motor to the source of line power.

8. A field-adjustable motor control system comprising:

a motor;

an inverter coupled to provide energization to the motor;

a controller coupled to the inverter, the controller providing signals to control the output of the inverter in response to received input control signals and in response to field adjustment signals, wherein the input control signals define a first and a second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state; and a relay coupled at its inputs to a source of line power and to the output of the inverter and at its output to the motor, the relay receiving control signals from the controller and being configured such that, in the event of a failure of the controller, the relay will couple the line power to the motor, wherein, in response to the input control signals defining the first operating state, the controller controls the output of the inverter in accordance with a first volt vs. hertz relationship, and wherein, in response to the input control signals defining the second operating state, the controller controls the output of the inverter in accordance with a second volt vs. hertz relationship, the first volts vs. hertz relationship being different than the second volts vs. hertz relationship.

9. A motor control system comprising:

a motor;

an inverter coupled to provide energization to the motor;

a controller coupled to the inverter, the controller providing signals to control the output of the inverter in response to received input control signals to provide a level of output power to the motor, the desired level of output power being determined at least in part by the input control signals;

wherein the input control signals define a first and a second operating state of the controller, each of the first and second operating states corresponding to a desired operating state of the system;

a first field adjustment circuit for providing a first field adjustment signal to the controller, the first field adjustment signal, in combination with the input control signals, defining a desired output parameter of the inverter for the first operating state;

a generally L-shaped bracket assembly;

a lid element adapted to be coupled to the curved exterior of a blower housing, the generally L-shaped bracket assembly being hingedly coupled to the generally L-shaped bracket assembly; and a control module containing circuit components for an inverter and an electronic controller, mounted to the generally L-shaped bracket assembly such that, when the L-shaped bracket assembly is in a first position wherein the L-shaped bracket assembly makes contact with the lid assembly, access to the control module is blocked by the bracket assembly, and when the L-shaped bracket assembly is swung open along the hinged connection access to the control module is enabled.

10. A fail-safe motor control system comprising:

a motor;

an inverter coupled to provide energization to the motor;

a controller coupled to the inverter, the controller providing signals to control the output of the inverter in response to received input control signals and in response to field adjustment signals; and a relay coupled at its inputs to a source of line power and to the output of the inverter and at its output to the motor, the relay receiving control signals from the controller and being configured such that, in the event of a failure of the controller, the relay will couple the line power to the motor.

11. A fail-safe motor control system comprising:

a motor;

an inverter coupled to provide energization to the motor;

a controller coupled to the inverter, the controller providing signals to control the output of the inverter in response to received input control signals and in response to field adjustment signals; and a relay coupled at its inputs to a source of line power and to the output of the inverter and at its output to the motor, the relay receiving control signals from the controller and being configured such that, in the event of a failure of the controller, the relay will couple the line power to the motor, wherein the relay includes a coil and, when the relay coil is unenergized, the relay couples the motor to the source of line power.

12. A fail-safe motor control system comprising:

a motor;

an inverter coupled to provide energization to the motor;

a controller coupled to the inverter, the controller providing signals to control the output of the inverter in response to received input control signals, the controller being configured such that it will not provide signals to control the inverter if the power to the controller is insufficient to ensure proper controller operation;

a relay coupled at its inputs to a source of line power and to the output of the inverter and at its output to the motor, the relay receiving control signals from the controller, wherein the relay includes a relay coil, and wherein the relay couples the output of the inverter to the motor when the relay coil is in an unenergized state; and a switching element coupled between the relay coil and a source of power and receiving a control signal from the controller, the switching element and the relay coil being configured such that, in the absence of a control signal from the controller, the relay coil is energized and, when a control signal from the controller is provided to the switching element, the relay is unenergized.

13. A fail-safe motor control system comprising:

a motor;

an inverter coupled to provide energization to the motor;

a controller coupled to the inverter, the controller providing signals to control the output of the inverter; and means coupled to the motor, the inverter, the controller, and line power for:

(a) coupling the motor to line power when the controller fails but line power is sufficient to drive the motor; and (b) coupling the motor to the output of the inverter and not driving the inverter, such that no power is provided to the motor, when the controller fails and line power is inadequate to drive the motor.

14. A fail-safe motor control system comprising:

a motor;

an inverter coupled to provide energization to the motor;

a relay coupled at one input to a source of line power and at another input to the output of the inverter, the relay being coupled at its output to the motor and being set in a first state where line power is provided to the motor and a second state where the output of the inverter is provided to the motor; and a controller coupled to the inverter and the relay, the controller receiving a signal corresponding to the current output of the inverter, the controller further providing signals to control the output of the inverter and the state of the relay, wherein the controller monitors the current from the inverter and, if during normal operation where current should be flowing to the motor, the controller detects that no current or current below a defined level is going to the motor, the controller provides signals to the place the relay in the first state.

* * * * *